United States Patent [19]

Takahashi et al.

[11] Patent Number: 4,870,583
[45] Date of Patent: Sep. 26, 1989

[54] CONSTANT SPEED CRUISE CONTROL SYSTEM OF THE DUTY RATIO CONTROL TYPE

[75] Inventors: Minoru Takahashi; Jiro Masuda; Akira Miyazaki; Masaki Hitotsuya; Hirofumi Yamasaki; Junji Takahashi, all of Kobe; Tatsuo Teratani, Toyota; Takeshi Tachibana, Toyota; Masumi Nagasaka, Toyota, all of Japan

[73] Assignees: Fijitsu Ten Limited, Hyogo; Toyota Jidosha Kabushiki Kaisha, Aichi, both of Japan

[21] Appl. No.: 948,134
[22] Filed: Dec. 29, 1986

[30] Foreign Application Priority Data

| Dec. 26, 1985 | [JP] | Japan | 60-294224 |
| Dec. 26, 1985 | [JP] | Japan | 60-294225 |
| Dec. 26, 1985 | [JP] | Japan | 60-294226 |
| Dec. 26, 1985 | [JP] | Japan | 60-294227 |
| Dec. 26, 1985 | [JP] | Japan | 60-294228 |
| Dec. 26, 1985 | [JP] | Japan | 60-294229 |
| Dec. 27, 1985 | [JP] | Japan | 60-298125 |
| Dec. 27, 1985 | [JP] | Japan | 60-298130 |
| Dec. 27, 1985 | [JP] | Japan | 60-298131 |
| Dec. 27, 1985 | [JP] | Japan | 60-298132 |
| Dec. 28, 1985 | [JP] | Japan | 60-298849 |
| Apr. 14, 1986 | [JP] | Japan | 61-85491 |

[51] Int. Cl.⁴ ............ G05D 13/58; B60K 31/00
[52] U.S. Cl. ............ 364/426.04; 180/178; 364/162; 364/431.07
[58] Field of Search ........... 364/424, 426, 162; 180/176, 177, 178, 179

[56] References Cited

U.S. PATENT DOCUMENTS

| 2,946,943 | 7/1960 | Nye et al. | 364/162 X |
| 3,893,537 | 7/1975 | Sakakibara | 180/176 |
| 4,402,376 | 9/1983 | Hayashi et al. | 364/426 X |
| 4,419,729 | 12/1983 | Krieder | 364/426 |
| 4,479,184 | 10/1984 | Nakano | 364/426 X |
| 4,484,279 | 11/1984 | Muto | 364/426 |
| 4,598,370 | 7/1986 | Nakajima et al. | 364/426 |
| 4,723,213 | 2/1988 | Kawata et al. | 364/426 |

OTHER PUBLICATIONS

Aylor et al: Design and Application of a Microprocessor PID Predictor Controller, IEEE Transactions on Electronics and Control Instrumentation, vol. IECI-27, No. 3, Aug. 1980, pp. 133-137.

Fishbeck: Writing P-I-D Control Loops Easily in Basic, Control Engineering, vol. 25, No. 10, Oct. 1978, pp. 45-47.

Ribbens et al: Understanding Automotive Electronics, Chapter 8 of Texas Instruments (publication), 1984, pp. 209-225 of Interest.

Primary Examiner—Felix D. Gruber
Attorney, Agent, or Firm—Wenderoth, Lind & Ponack

[57] ABSTRACT

A constant speed cruise control system of duty ratio control type for approximating an actual car speed to a stored target car speed, by on/off control of a control valve of an actuator to adjust the throttle valve opening degree by an output duty ratio D obtained from a control line having a gradient showing a conversion characteristic of car speed and duty ratio.

The system has a controller in which a set duty ratio DS corresponding to the target car speed is calculated as $$SD = SD1 + (DM - SD1)/n$$

and the output duty ratio D is calculated as $$D = G \times V + SD$$

where
G: gradient of control line
V: car speed deviation
DM: integrating element responding quickly to duty ratio change
SD1: integrating element responding slowly to duty ratio change
n: coefficient and the controller corrects to integrate the set duty ratio SD in a direction of approximating the output duty ratio D.

15 Claims, 43 Drawing Sheets

BASIC METHOD  Fig. 18(A)
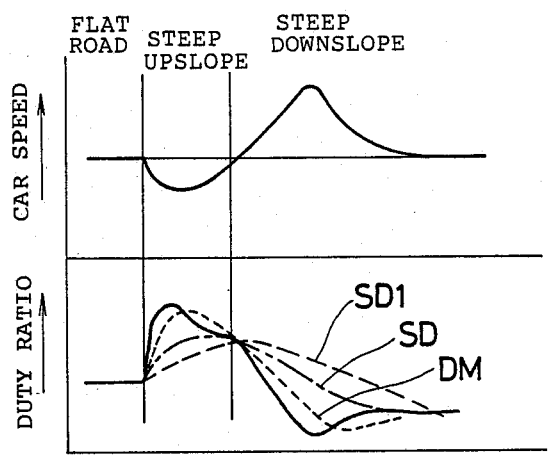
IMPROVED METHOD OF  Fig. 18(B)
THIS INVENTION
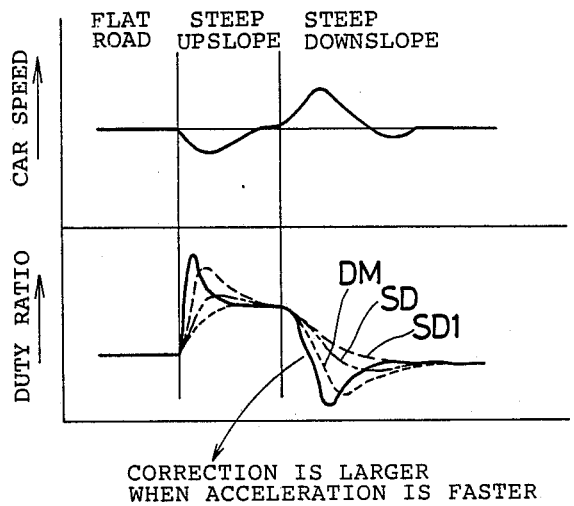
CORRECTION IS LARGER
WHEN ACCELERATION IS FASTER

CONSTANT SPEED CRUISE CONTROL SYSTEM OF THE DUTY RATIO CONTROL TYPE

BACKGROUND OF THE INVENTION

1. Field of the Invention

The present invention relates to a constant speed cruise control system of the duty ratio control type and a leading angle control method, and more particularly to an arrangement for performing a control to decrease the car speed deviation quickly and a control to nullify the car speed deviation slowly at the same time, by setting an integrating element 1 responding quickly to a duty ratio change and an integrating element 2 responding slowly to a duty ratio change, in order to reduce the difference between a set car speed and an actual car speed (referred to as a car speed deviation $\Delta V$ hereinafter) to zero.

2. Description of the Prior Art

An automotive constant speed cruise control system, known as an Auto-Drive or an automatic speed control, is intended to control the car speed constantly, once a desired car speed is preset, without having to step on the accelerator pedal, and in a generally known system, the coil for a control valve of a negative pressure type actuator used to drive the accelerator link, using an engine negative pressure (e.g. an intake manifold negative pressure, a vacuum pump negative pressure or the like) as a driving source, is driven by a pulse signal of a duty ratio corresponding to the difference between the detected traveling car speed (detected car speed) and the car speed preset by the driver (target car speed).

The constant speed cruise control system of the duty ratio control type controls constant speed travel by determining a set duty ratio which is a duty ratio necessary for traveling at a constant speed at a target car speed (preset car speed), and providing a new ratio by adding or subtracting a duty ratio corresponding to the difference between the target car speed and traveling car speed to or from the set duty ratio. However, the required duty ratio varies with the characteristics of the actuator, throttle drive system or engine, road surface gradient, engine load of air conditioner, vehicle load of speed change gear or other conditions, and if the set duty ratio is fixed, there occurs a car speed deviation corresponding to the difference from the required duty ratio.

In one of the conventional examples of such a constant speed cruise control system, the controller or ECU (electronic control unit) detects the traveling car speed by the signal from a car speed sensor having a reed switch which is turned on and off by a magnet rotating in proportion to the rotation of the vehicle drive shaft. When the present switch is turned on, the ECU stores the traveling car speed, and after it is turned off, it controls the duty ratio of the control valve of the actuator ACT. A negative pressure is introduced when the control valve is turned on, which raises the pressure generated by the diaphragm linked to the throttle valve S1. When turned off, the atmosphere is introduced to lower the pressure generated by the diaphragm. During this control period, the release valve is turned on, and the atmosphere is cut off. When a cancellation signal (e.g. from a clutch switch; or in an A/T car, from a neutral start switch, parking switch, or brake switch) is received, both the control valve and the release valve are turned off, and the atmosphere is let in from both to stop the control swiftly. When a resume switch is turned on after cancellation, control is restored at the car speed stored previously.

A microcomputer is used in the ECU, of which processing is described below. The output duty ratio D for on/off control of the control valve is determined depending on the difference between the target car speed VM stored in the memory and the traveling car speed Vn, but a skip car speed VS adding a car speed variation component (differentiation component) which is used. This is for compensating in advance for the action delay of the actuator, or the loss time due to hysteresis or play of the throttle valve or drive system in a leading direction. Therefore, the skip car speed VS is determined by the following equation.

$$VS = V_n + K \times (V_n - V_{n-1}) \qquad (1)$$

where
Vn: present car speed
$V_{n-1}$: previous car speed
K: proportional constant Incidentally, the output duty ratio D may be also determined as follows.

$$D = SD + \frac{VM - VS}{VB} \qquad (2)$$

where
SD: set duty ratio
VM: target car speed (stored car speed)
VB: control speed width In the above equation, VM-VS is a car speed deviation $\Delta V$, and the control speed width VB is an inverse of control gain (i.e. the gradient of the line) G, so that equation (2) may be rewritten as follows.

$$D = G \times \Delta V + SD \qquad (3)$$

In the prior art, meanwhile, since the reference value of the duty ratio necessary for constant speed travel is fixed as a set duty ration, a car speed deviation occurs due to fluctuations in the actuator system or vehicle load variations. For example, a shown in FIG. 1, if the set duty ration SD corresponding to the stored car speed VM (e.g. 80 km/h) is 40% and the required duty ratio D is 55%, the control reference point initially located at point A converges at point B along with the decline of the car speed due to the lack of duty ratio. Since the required duty ratio at point B is also nearly 55% (to be more precise, there is a car speed coefficient of about 0.1%/km/h for the required duty ratio as indicated by chain-line 28, but it may be almost ignored in this example), when the control speed width VB is, for example, 20 km/h, a deviation of $$20 \times \frac{40 - 55}{100} = -3 \text{ km/h} \qquad (4)$$

occurs, and the car is controlled at 77 km/h at point B.

Accordingly, such a vehicle cruises at a constant speed as shown in FIG. 2, with the travel speeds varying with the road loads.

This phenomenon will be described in further detail.

The prior control system of the constant speed cruise control can be roughly represent as shown in FIG. 3 if its non-linear element is disregarded.

FIG. 4 depicts the control system in terms of its relationships with the target car speed.

Suppose cruising is maintained with an actual car speed in complete agreement with the target value under a particular condition, and that the target speed varies stepwise by a factor of B. Another way of saying this is that to the target car speed V(S) is given B/S, and the target value X(S) transmitted to the feedback system tracks the variation path and converges into V(S) as depicted in FIG. 5. On the contrary, the actual car speed Y(S) varies as in FIG. 5. The final value of the deviation Z(S) between X(S) and Y(S) is given by:

$$\lim_{S \to 0} X(S) \, S \frac{1}{1 + G(S)A} = \frac{B}{1+A} \quad (4a)$$

However, $$X(S) = \frac{(1 + T_V S)^2}{1 + K(S)} \frac{B}{S}$$

$$G(S) = \frac{(1 + KS)}{(1 + T_A S)(1 + T_W S)(1 + T_V S)^2}$$

This indicates that under a given condition there is only one actual car speed, if any which is in perfect agreement with the target value, and that under different conditions a deviation unavoidably occurs between them.

FIG. 6 shows the control system in terms of its relationships with road loads.

Here again, let us assume that cruising is continued with the target car speed and the actual value being in complete harmony with each other. Also assume that load changes occur stepwise by C at time t1.

Expressed in other terms, a load U(S) is given at C/S. F(S) (the car speed corresponding to the load variation) signalled to the feedback system traces the path illustrated in FIG. 7, and Y(S) varies therewith.

This indicates variation in the load induces changes in the actual car speed without any change of the target value, i.e., the actual car speed varies with changing road gradient without varying the target car speed.

If A is made larger to give a smaller deviation regardless of stability, it becomes possible to decrease q(t)t→∞.

This leads to an inevitable reduction of q(t)t→∞ and hence a smaller deviation due to changes in target car speed can be attained, but the variations in car speed due to load changes become greater.

As noted previously, the fixed set duty ration system of the prior art inevitably was involved in the creation of car speed deviations.

Such car speed deviations may be reduced to zero when the control criterion is corrected form point A to point C in FIG. 1. However, if the corrected speed is too low, then deviation convergence takes much time, while if the corrected speed is too high, stability could be impaired due to excessive correction.

Incidentally, since constant speed travel control starts by pressing a set switch while traveling to store the traveling speed at that time as a target car speed, sudden duty ration fluctuations occur right after this setting. Accordingly, i the same control as in the subsequent constant speed travel is effected, the change of SD is too fast, and a car speed hunting as shown in FIGS. 8(A) and 8(B) may continue.

In equation (2), meanwhile, the control speed width VB denotes a range of car speed for varying the output duty ration D linearly in a range of 0 to 100%, and its inverse is the gain. The set duty ratio SD is the duty ratio corresponding to the target car speed VM, and ideally it is the control reference point.

The leading angle control described above obtains a skip car speed (leading angle car speed) VS by adding the differential value (acceleration) V of the traveling car speed Vn, wherein if Vn changes, VS varies as shown in FIG. 9, so that the change in Vn may be fed back to the output duty ratio D in advance.

However, if the car speed changes suddenly due to abrupt variations of the road surface or shift-down of an automatic transmission car, a sufficient controllability (response) is hard to obtain, partly because of the effects of the car speed filter (integrating filter).

Accordingly, one of the objects of the invention is to nullify car speed deviation during constant speed travel.

Another object of the invention is to enhance traveling stability.

A further object of the invention is to prevent hunting right after setting.

Another object of the invention is to make a car speed change small even if a sudden change of a car speed occurs when a road gradient changes suddenly.

SUMMARY OF THE INVENTION

A constant speed cruise control system in accordance with the invention comprises:
   car speed detecting means for generating a signal in accordance with an actual traveling speed form a car speed sensor;
   memory means for storing the actual traveling speed detected by the car speed detecting means as the stored target speed in response to manipulating of a set switch;
   means for calculating a set duty ratio SD in accordance with a difference between the actual traveling speed and the stored target speed;
   means for actuating the control valve in response to a output duty ratio D which is introduced by adding the set duty ratio SD to the duty ratio;
   correction means for amending the set duty ratio SD to exclude a car speed deviation which occurs when the output duty ratio D changes, comprising;
   first means for calculating a low-speed integrating element SD1 following gradually to a value of the output duty ratio D in response to changing of the output duty ratio D;
   second means for calculating a high-speed integrating element DM following quickly to a value of the output duty ratio D in response to changing of the output duty ratio D;
   third means for calculating a first correction value of (DM - SD1)/n
   wherein
   SD1: the low-speed integrating element
   DM: the high-speed integrating element
   n: predetermined coefficient
   fourth means for calculating the set duty ratio SD based on the low-speed integrating element SD1 and the first correction value.

Thus, in this invention, if change of set duty ratio is required duty to road surface variations or the like, the dynamic gain may be increased by the movement of element DM, and the element SD1 is moved while suppressing the car speed deviation, so that the car speed deviation may be nullified while arresting the car speed variations.

In a preferred embodiment, the first means includes a second calculating means which calculates a second correction value β determined in accordance with a difference between the low-speed integrating element SD1 or the set duty ratio SD and the output duty ratio D, and amends the low-speed integrating element SD1 in response to the second correction value β, the second means includes a third calculating means which calculates a third correction value of (D - DM)/K wherein
- D: the output duty ratio
- DM: the high-speed integrating element
- K: predetermined coefficient, and amends the high-speed integrating element DM in response to the third correction value.

In a preferred embodiment, the third means changes the predetermined coefficient K which determines a changes rate of the third correction value in accordance with the actual car speed and makes the changing rate large at high car speed.

In a preferred embodiment, a means for calculating a car acceleration is provided, the low-speed integrating element SD1 and the high-speed integrating element DM are amended in response to a correction value based on the acceleration as the values changes rapidly when the acceleration exceeds a specified value.

In a preferred embodiment,
an upper limit and a lower limit are provided in at least one of the low-speed integrating element SD1, the high-speed integrating element DM and the set duty ratio SD.

In a preferred embodiment, the first means fixes the second correction value β into values differentiated from one another in car speed regions for a specified speed after setting the target car speed.

In a preferred embodiment, the car speed detecting means comprises:
- means for measuring a time Ti of a specified number of consecution the pulses in response to the pulses corresponding to a car speed;
- first filtering means for filtering the time Ti;
- means for sampling a measuring the time Ti* filtered at a specified time internal and calculating a car speed Sn based on the time Ti* sampled;
- second filtering means for outputting as an actual car speed Xn* a value obtained by filtering the car speed Xn.

A constant speed cruise control system in accordance with the invention comprises:
- car speed detecting means for generating a signal in accordance with a actual traveling speed from a car speed sensor;
- memory means for storing the actual travelling speed detected by the car speed detecting means as the stored target speed in response to manipulating of a set switch;
- means for calculating set duty ratio SD in accordance with a basic duty in a constant speed control;
- means for calculating a duty ratio in accordance with a difference between the actual traveling speed and the stored target speed;
- means for actuating the control valve in response to a output duty ratio D which is introduced by adding the set duty ratio SD to the duty ratio;
- correction means for amending the set duty ratio SD to exclude a car speed deviation which occurs when the output duty ratio D changes, comprising:
  - first means for calculating a correction value in response to a difference between the set duty ratio SD and the output duty ratio D;
  - second means for amending the set duty ratio SD in response to the correction value γ.

Thus, in the constant speed cruise control system of duty ratio control type of this invention, since the basic duty ratio value is integrated and corrected by varying the speed depending on the difference from the output duty ratio, the car speed deviation can be eliminated at a practically sufficient speed without sacrificing the stability.

In a preferred embodiment, an upper limit and a lower limit are provided in the set duty ratio SD.

In a preferred embodiment, the first means fixes the correction value γ into values differentiated from one another in car speed regions for a specified speed after setting the target car speed.

In a preferred embodiment, the second means amends the set duty ratio SD as the ratio rapidly changes when a car acceleration exceeds a predetermined limit.

A constant speed cruise control system in accordance with the invention comprises:
- car speed detecting means for generating a signal in accordance with a actual traveling speed from a car speed sensor;
- memory means for storing the actual traveling speed detected by the car speed detecting means as the stored target speed in response to manipulating of a set switch;
- means for calculating a set duty ratio SD in accordance with basic duty in a constant speed control;
- means for calculating a duty ratio in accordance with a difference between the actual traveling speed and the stored target speed;
- means for actuating the control valve in response to a output duty ratio D which is introduced by adding the set duty ratio SD to the duty ratio;
- acceleration detecting means for detecting an acceleration of a car;
- correction means for adding a correction duty ratio to the output duty ratio D when the acceleration exceeds a specified value.

Thus, if sudden car speed changes should occur, a large correction is temporarily applied to the duty ratio, and the subsequent car speed changes (overshoot, etc.) may be reduced, so that the stability of constant speed control may be enhanced.

In a preferred embodiment, the correction means adds to the correction duty ratio increasing in response to the acceleration to the output duty ratio D when the acceleration exceeds the specified value.

In a preferred embodiment, the correction means adds the correction duty ratio increasing in response to elapsing of time to the output duty ratio D when the acceleration exceeds the specified value

BRIEF DESCRIPTIONS OF THE DRAWINGS

These and other objects, features and advantages of the invention will become more apparent upon a reading of the following detailed specification and drawings, in which.

Figure 8A:
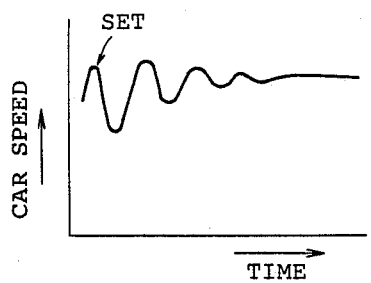
Figure 8B:
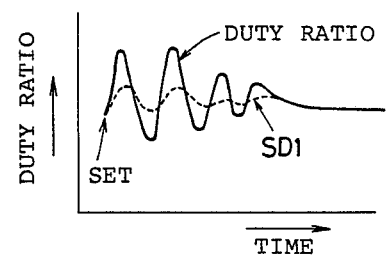
Figure 9:
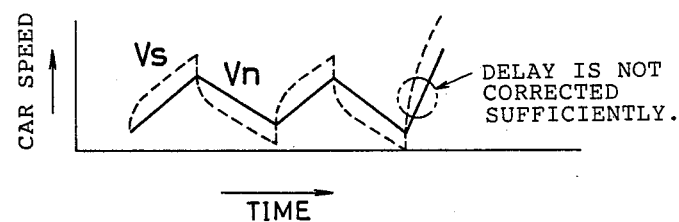
Figure 10:
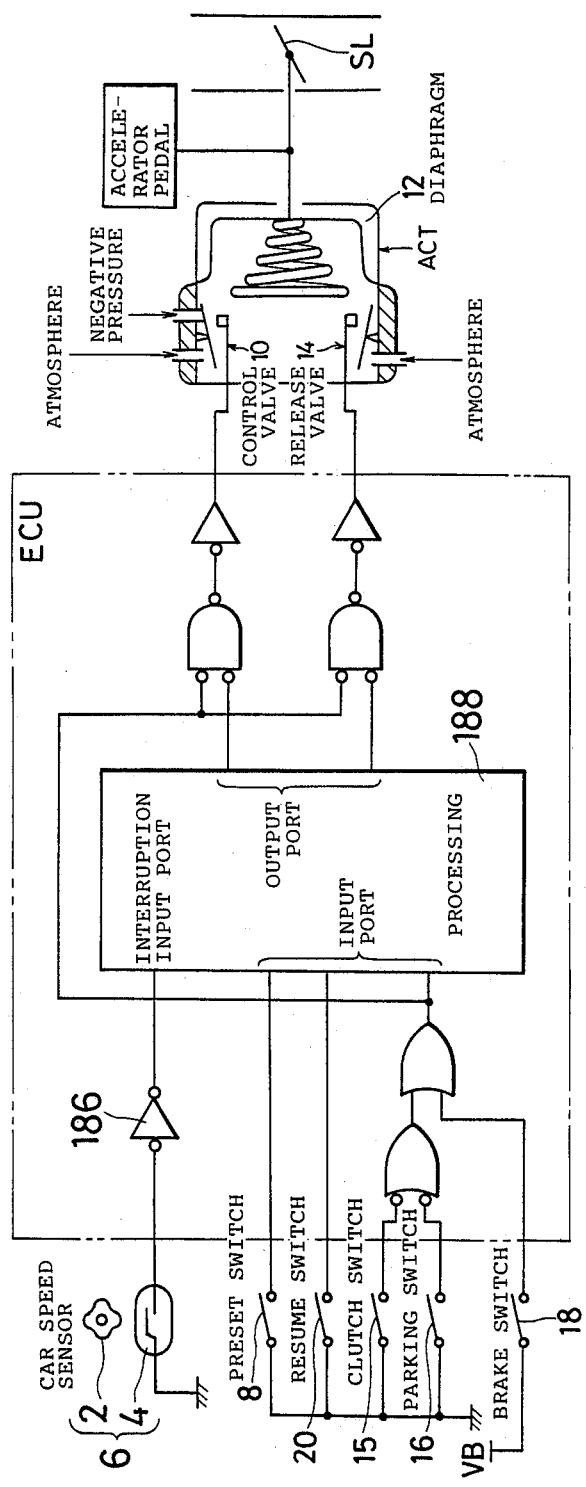
Figure 11:
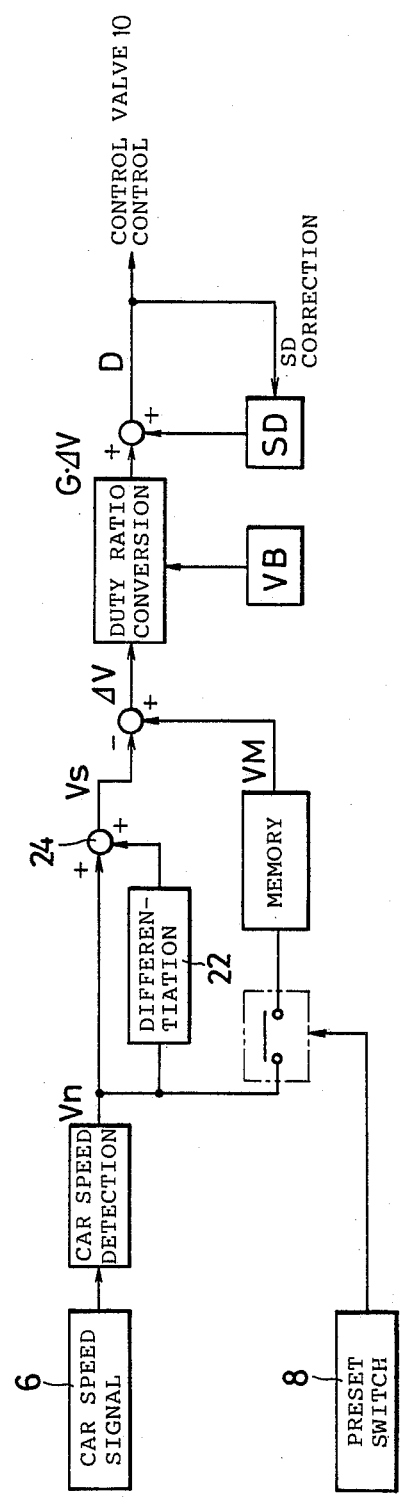
Figure 12A:
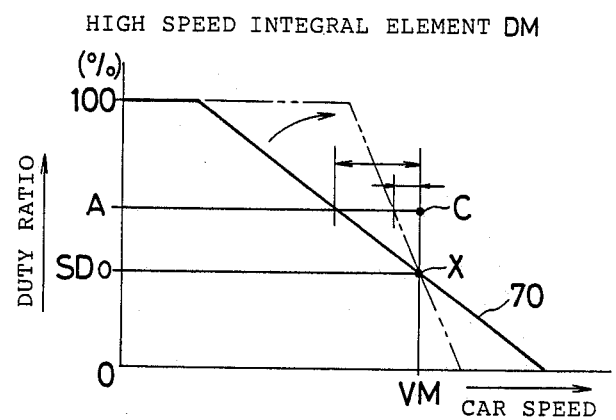
Figure 12B:
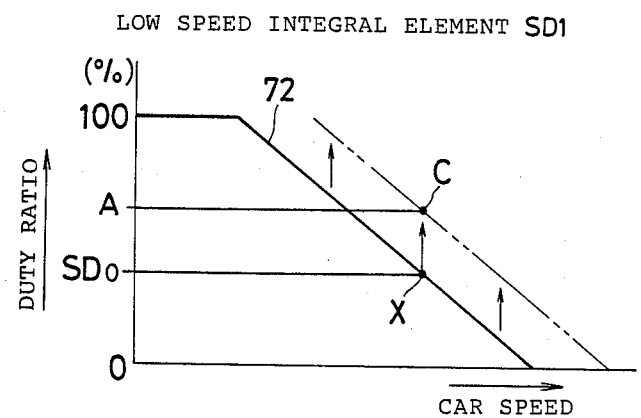
Figure 13A:
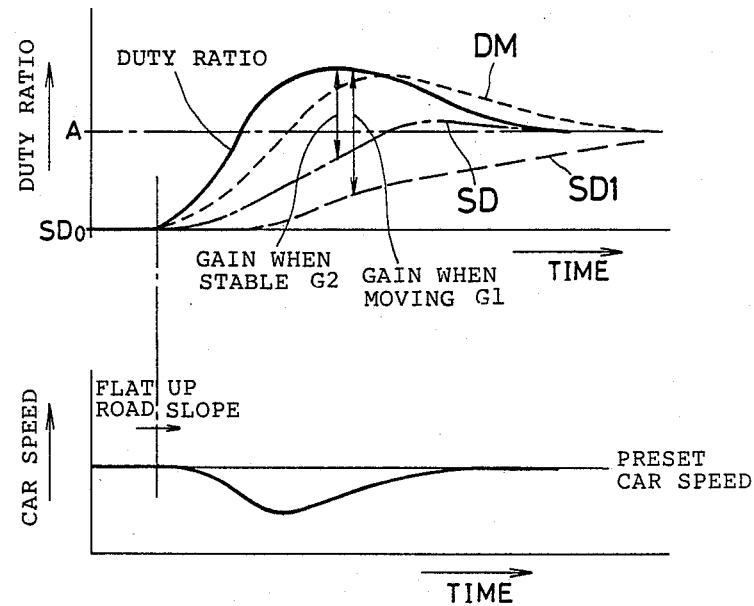
Figure 13B:
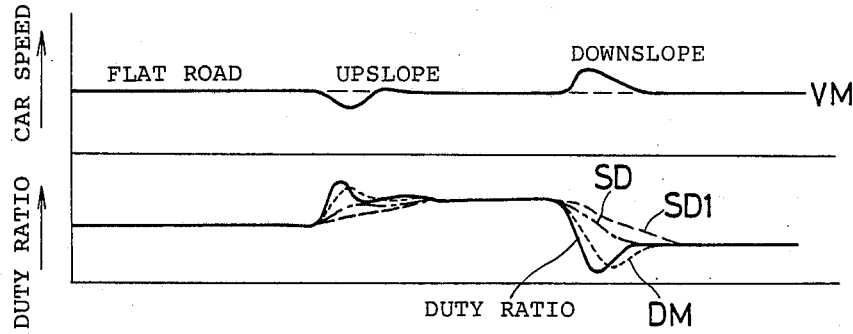
Figure 15A:
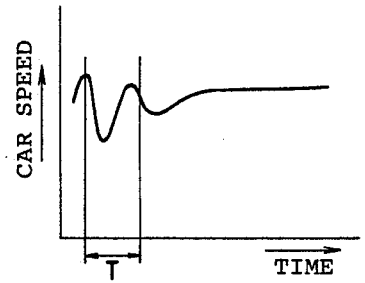
Figure 15B:
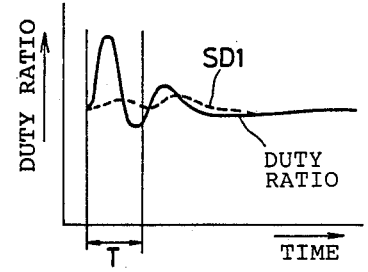
Figure 17A:
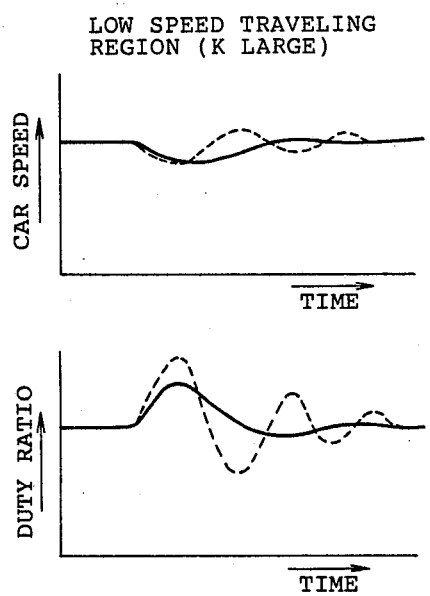
Figure 17B:
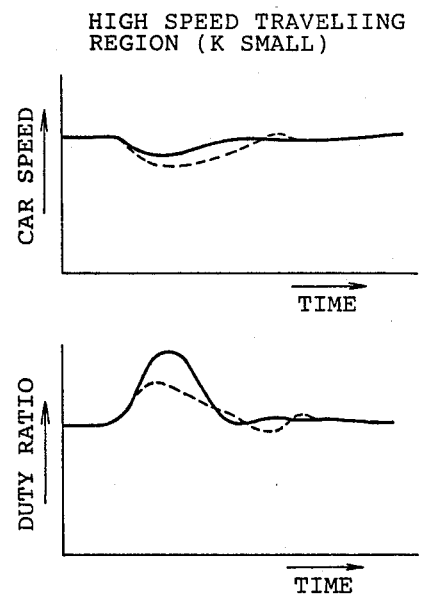
Figure 16A:
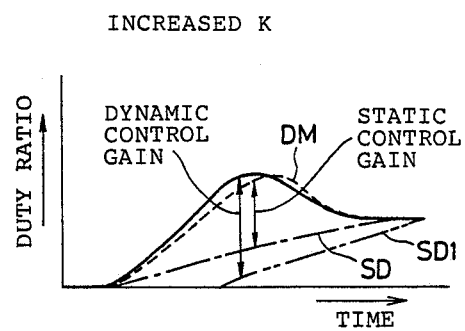
Figure 16B:
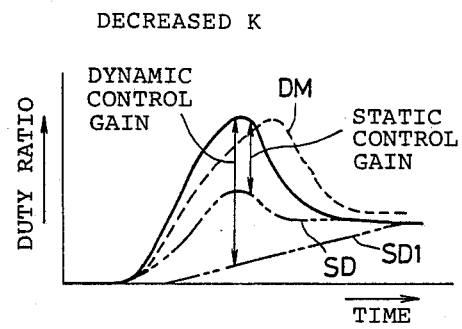
Figure 19A:
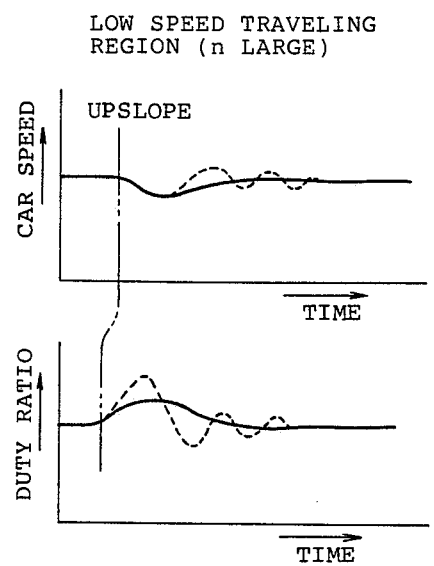
Figure 19B:
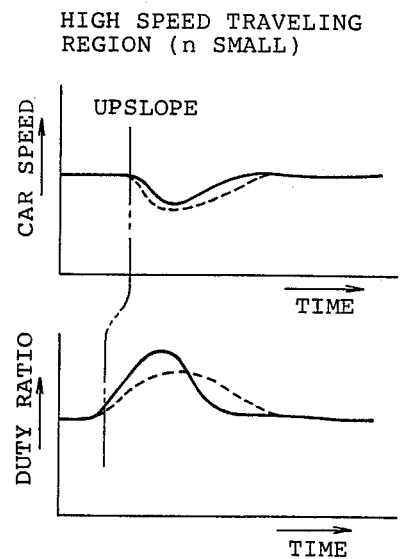
Figure 20A:
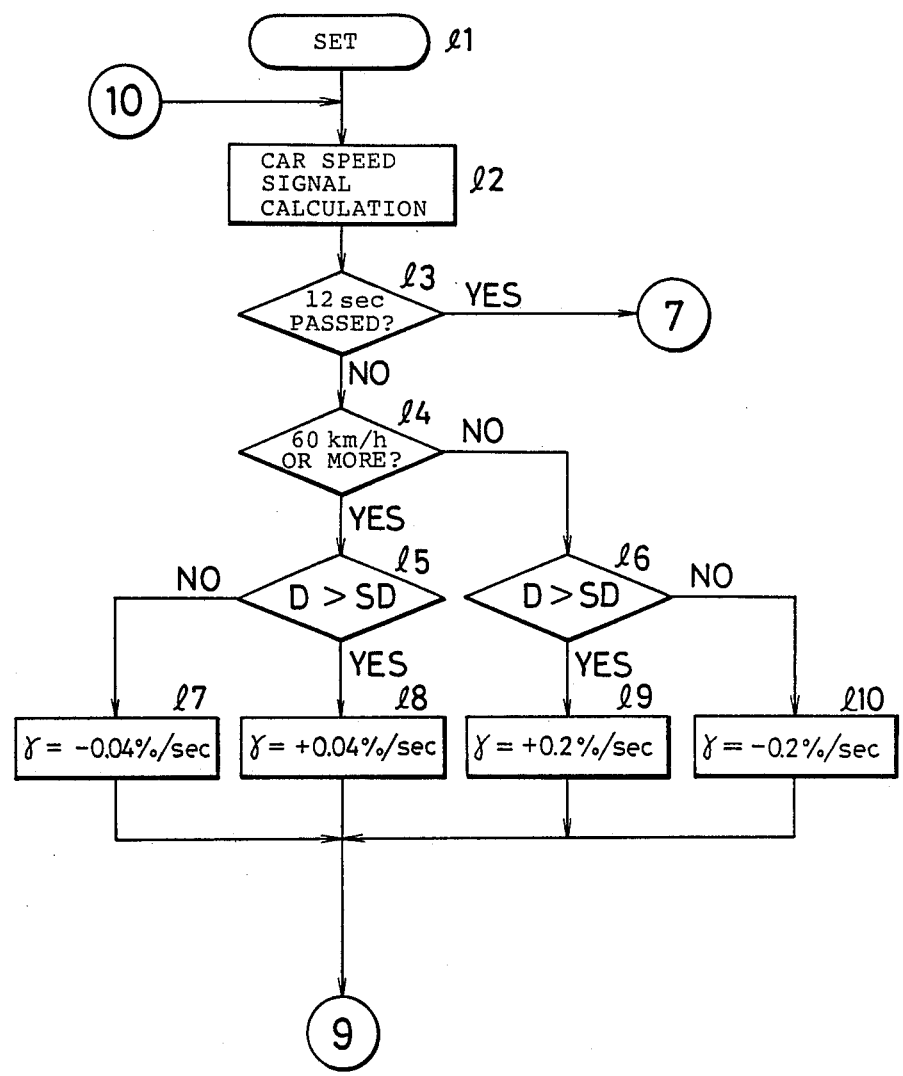
Figure 20B:
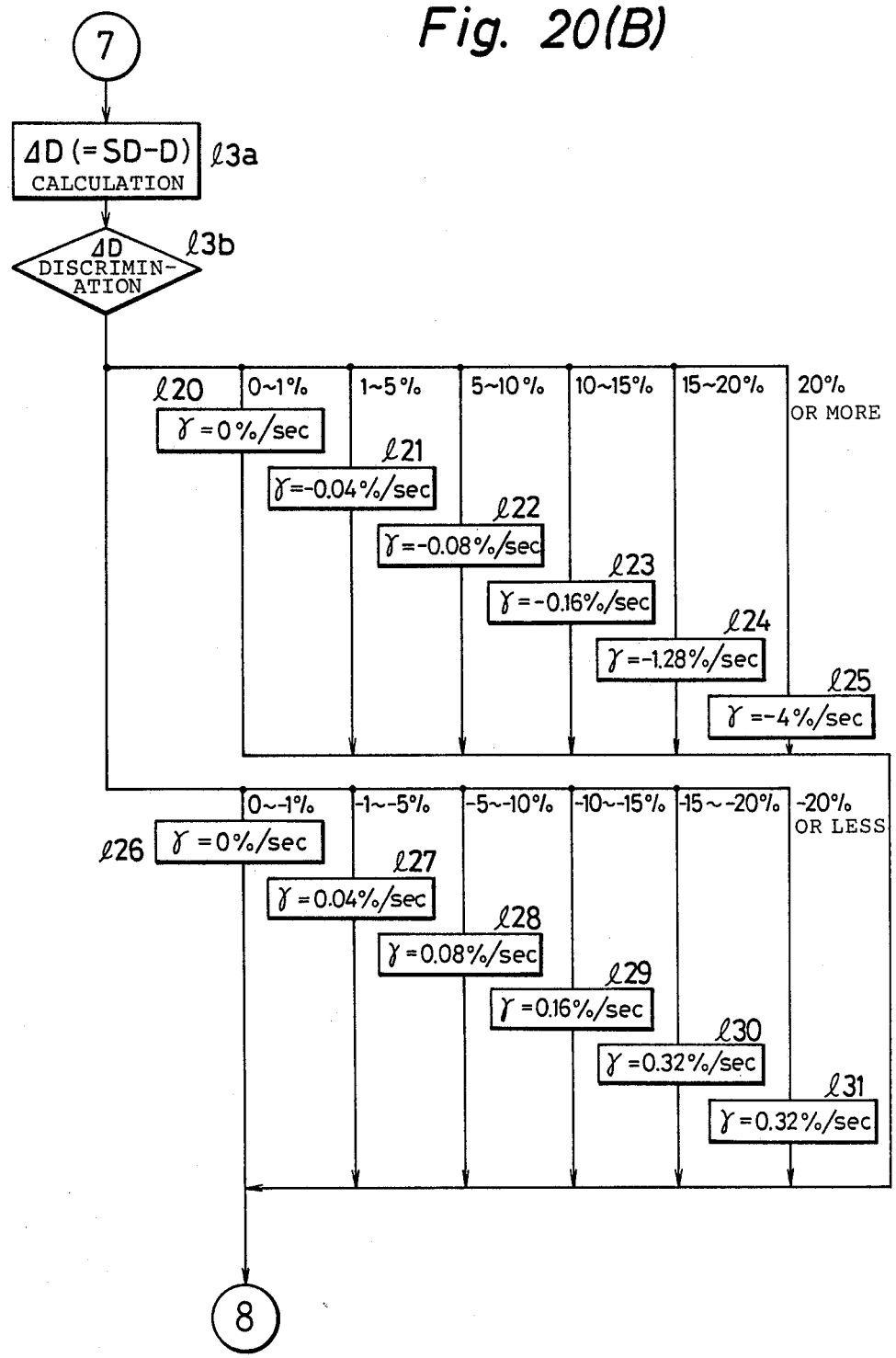
Figure 20C:
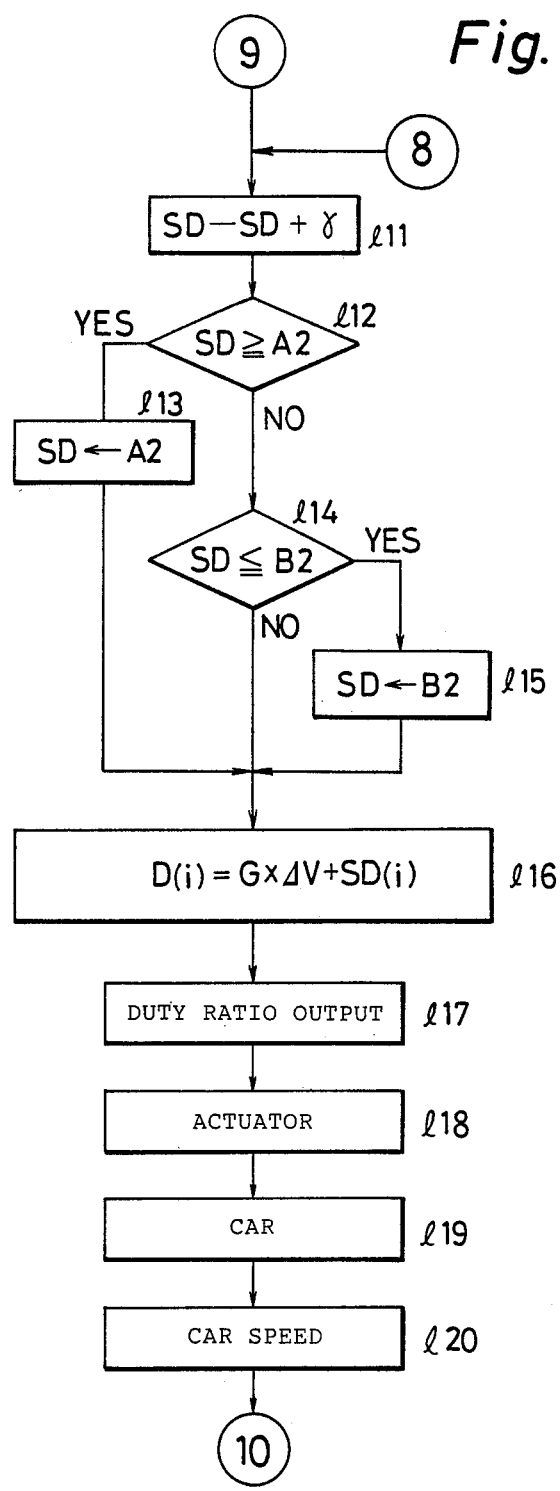
Figure 21:
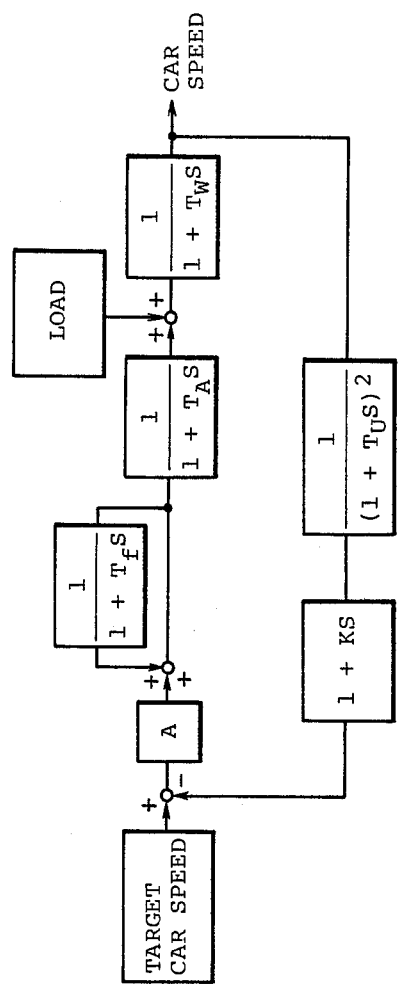
Figure 22:
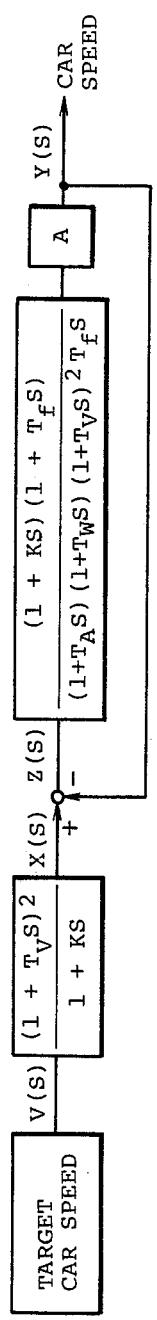
Figure 23:
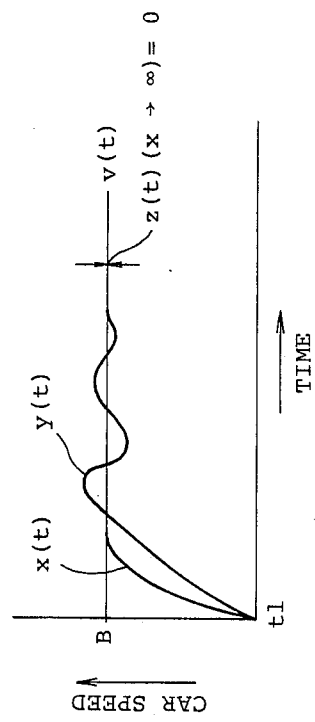
Figure 24:
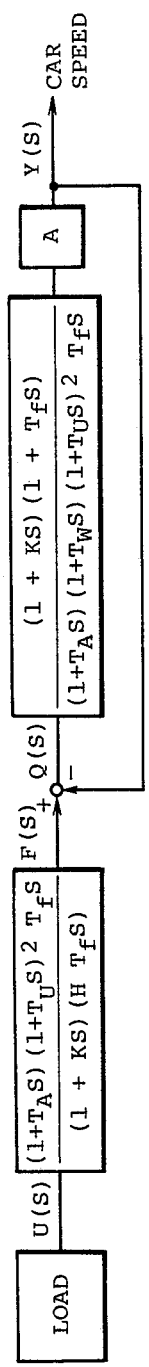
Figure 25:
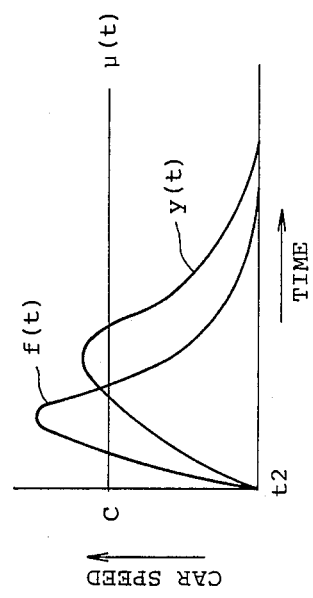
Figure 26:
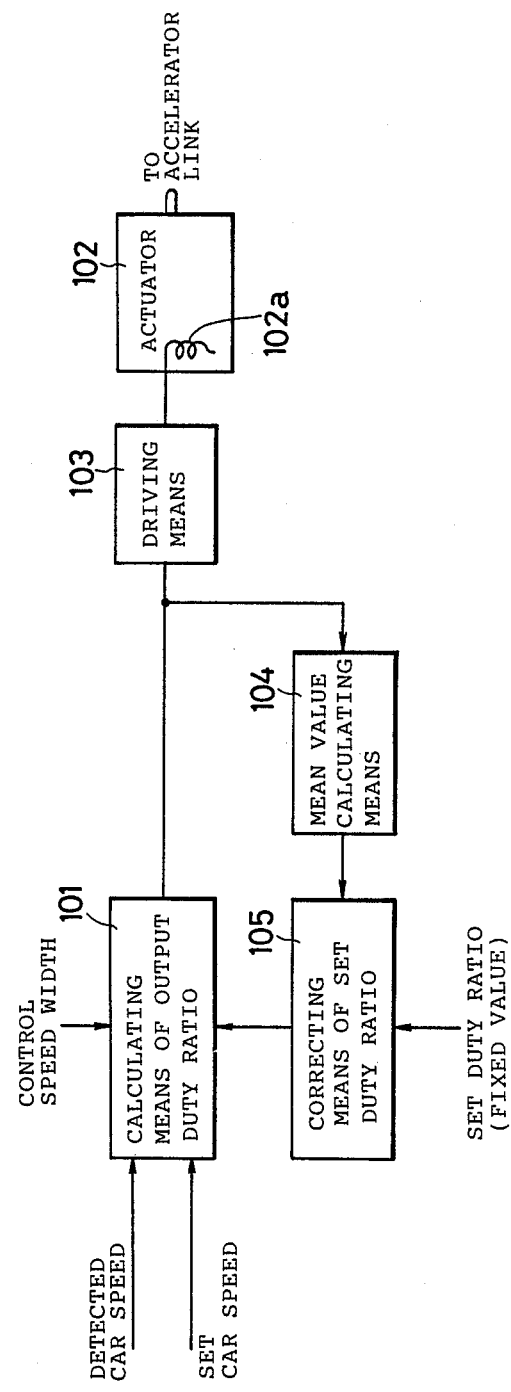
Figure 27:
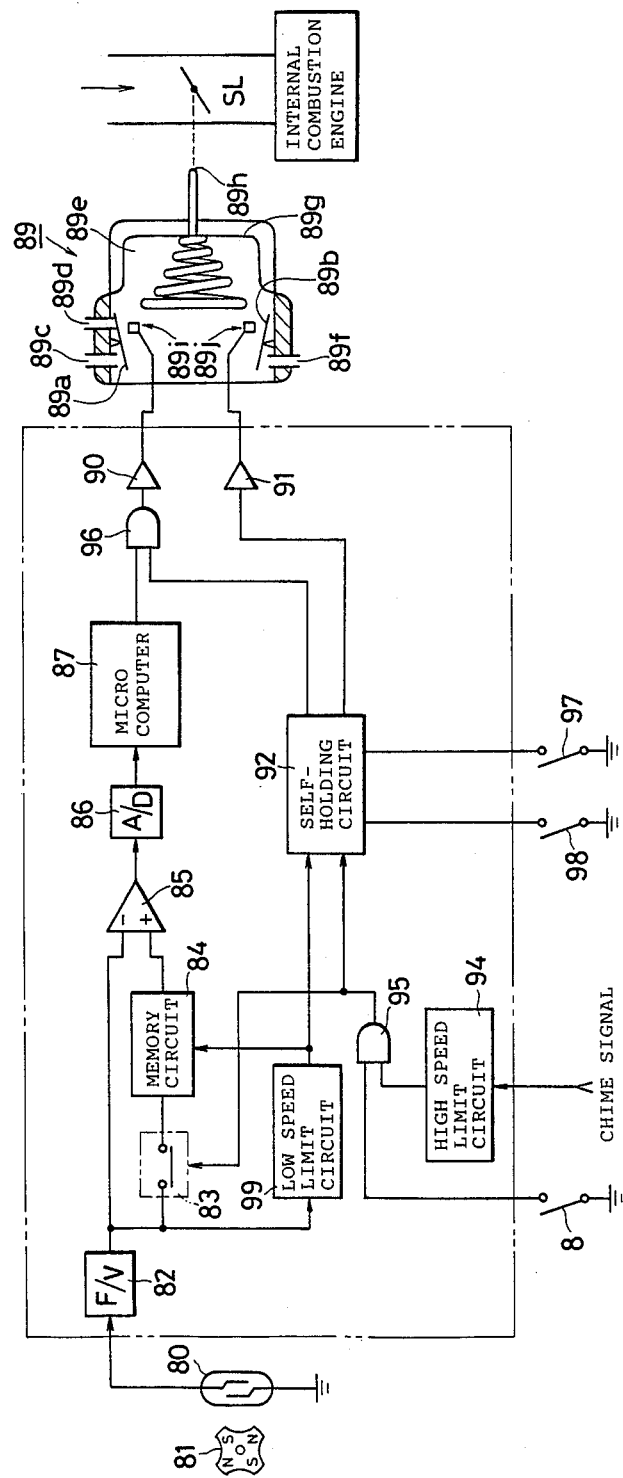
Figure 28:
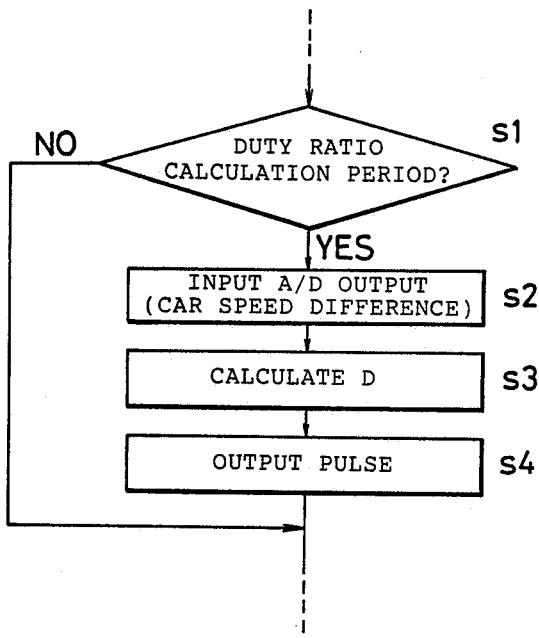
Figure 29:
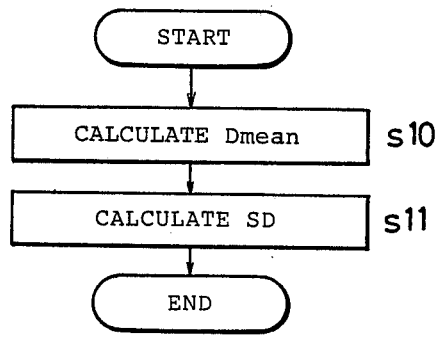
Figure 30:
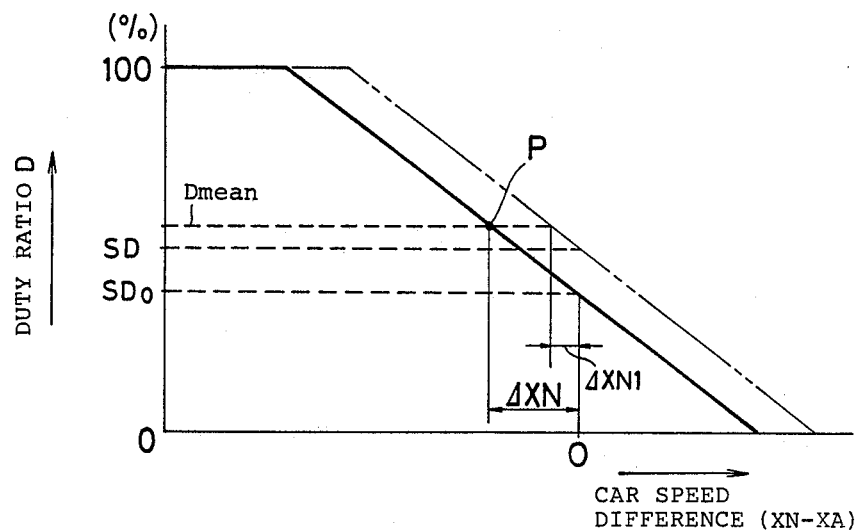
Figure 31:
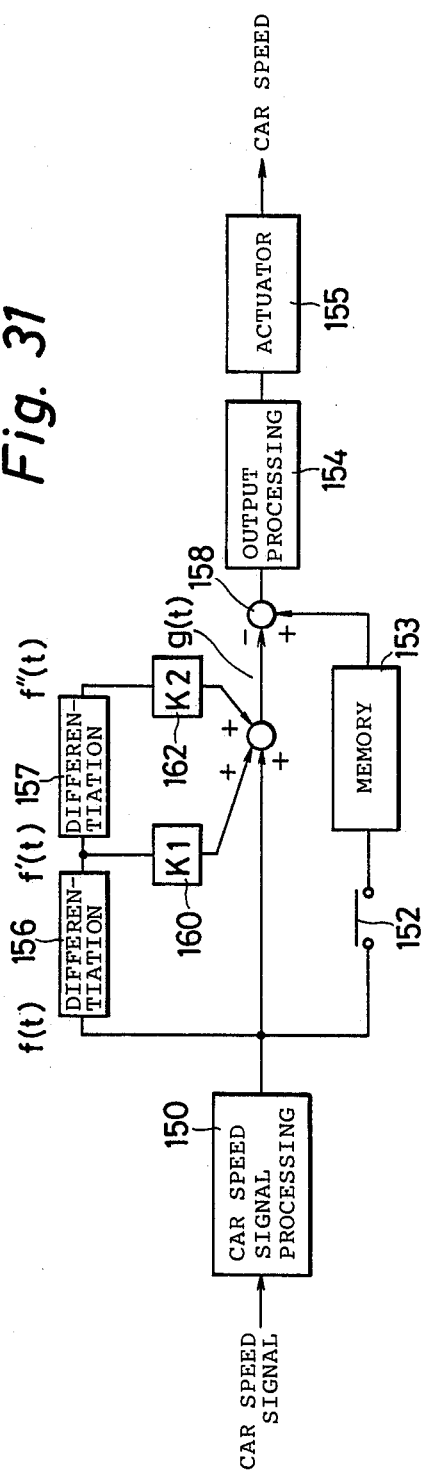
Figure 32B:
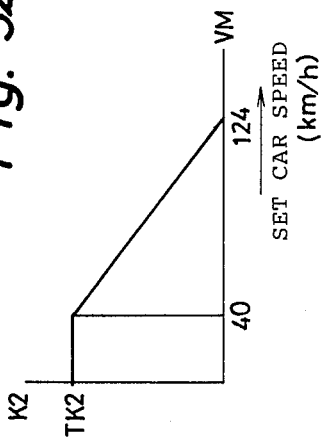
Figure 32A:
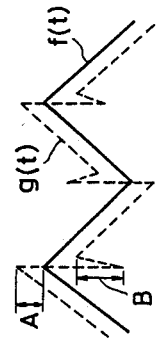
Figure 33:
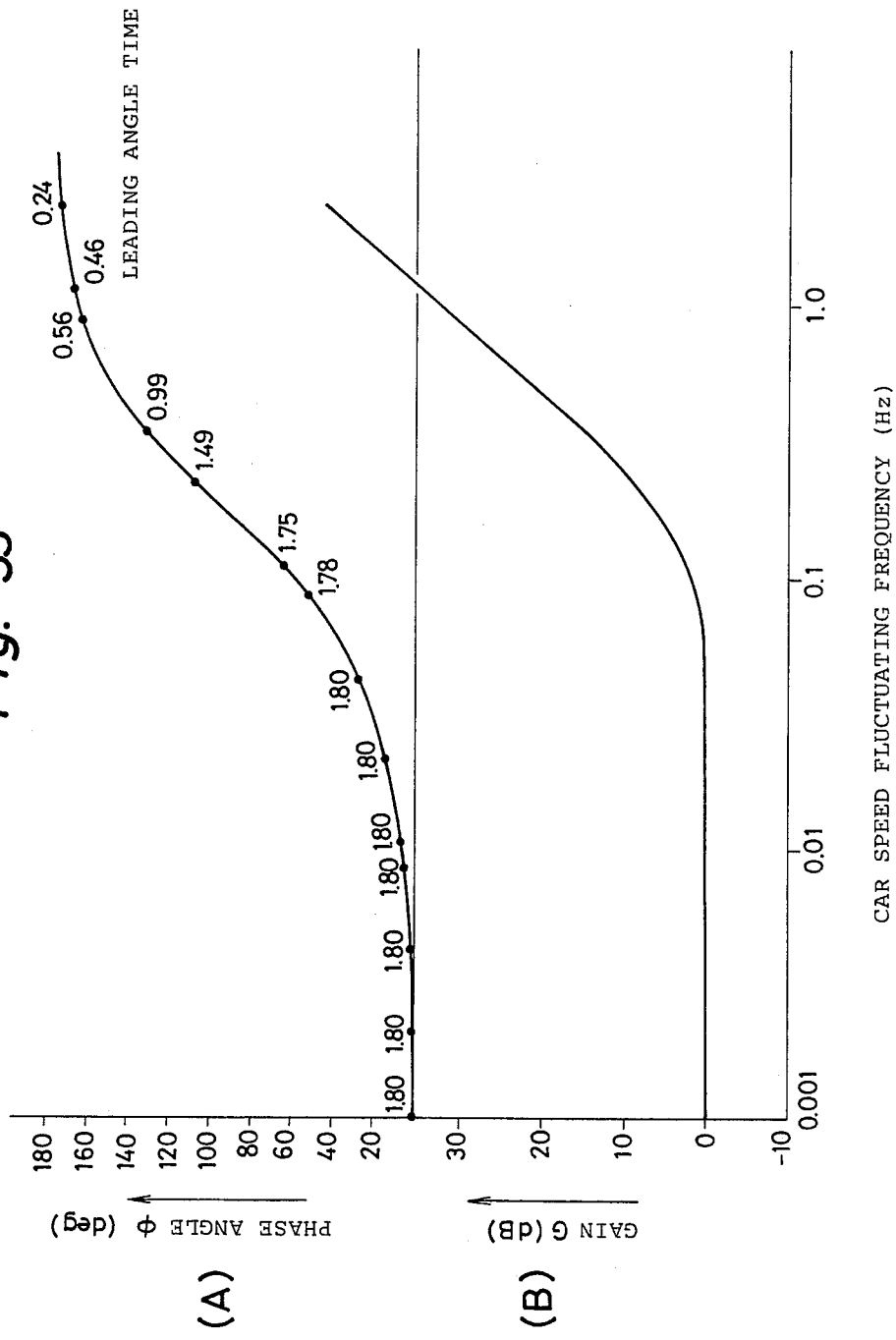
Figure 34A:
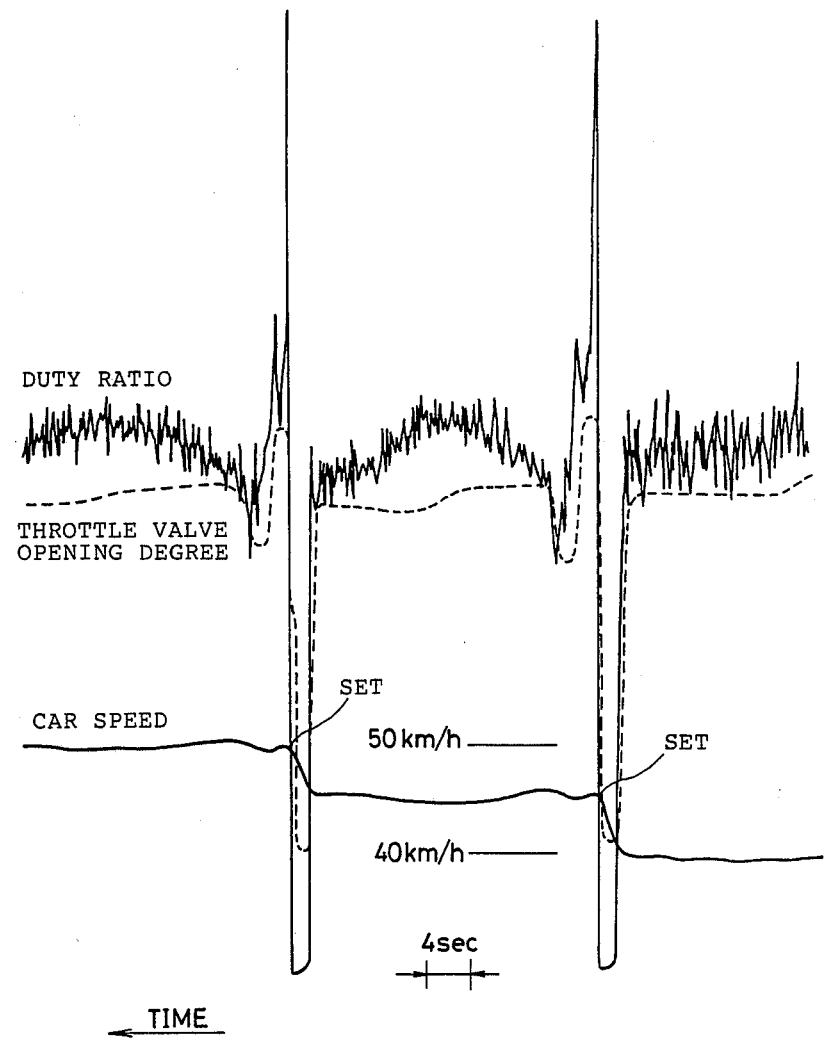
Figure 34B:
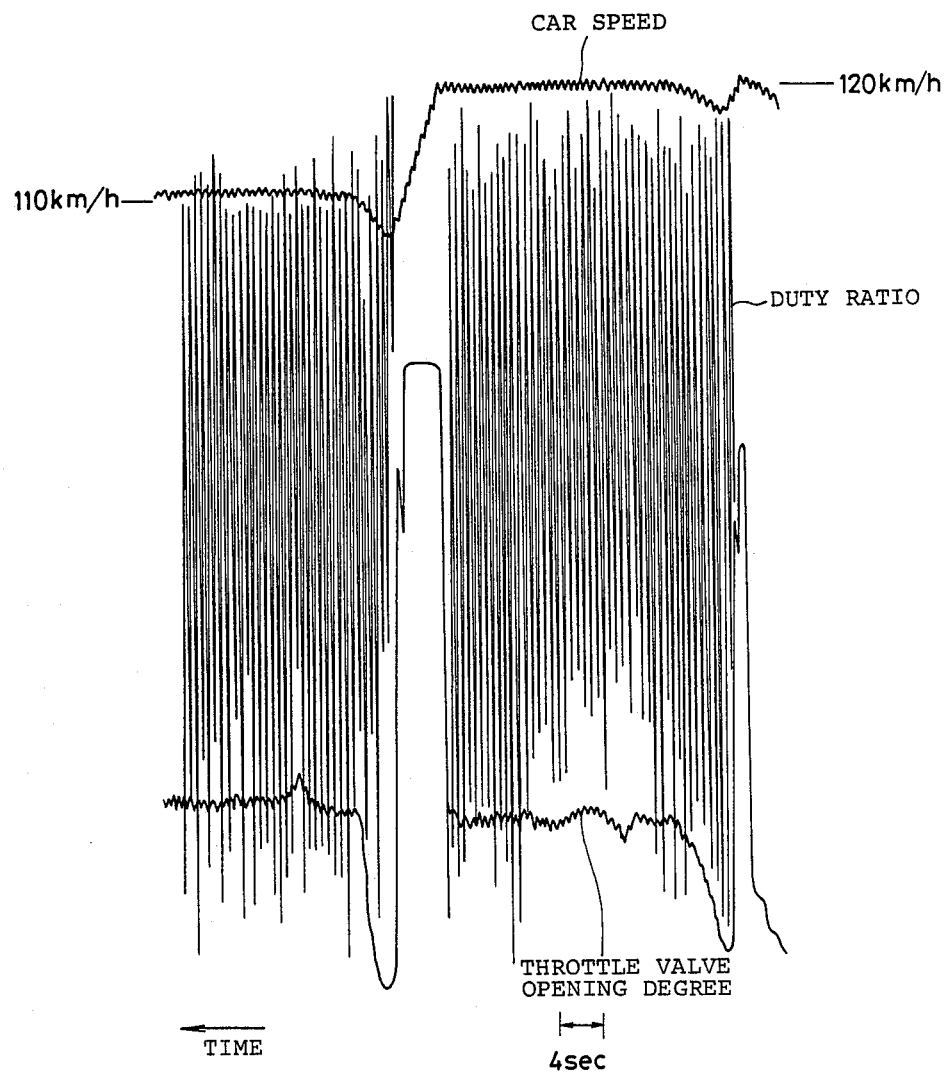
Figure 34C:
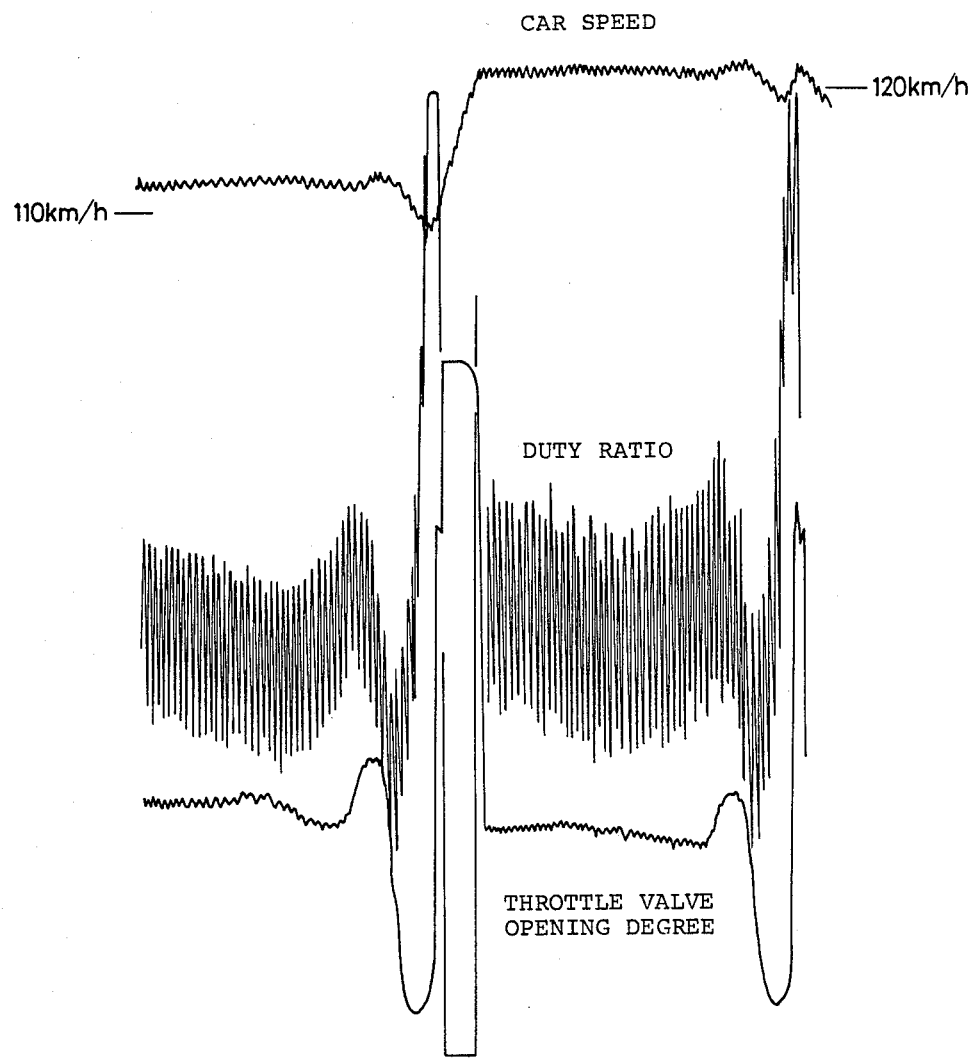
Figure 34D:
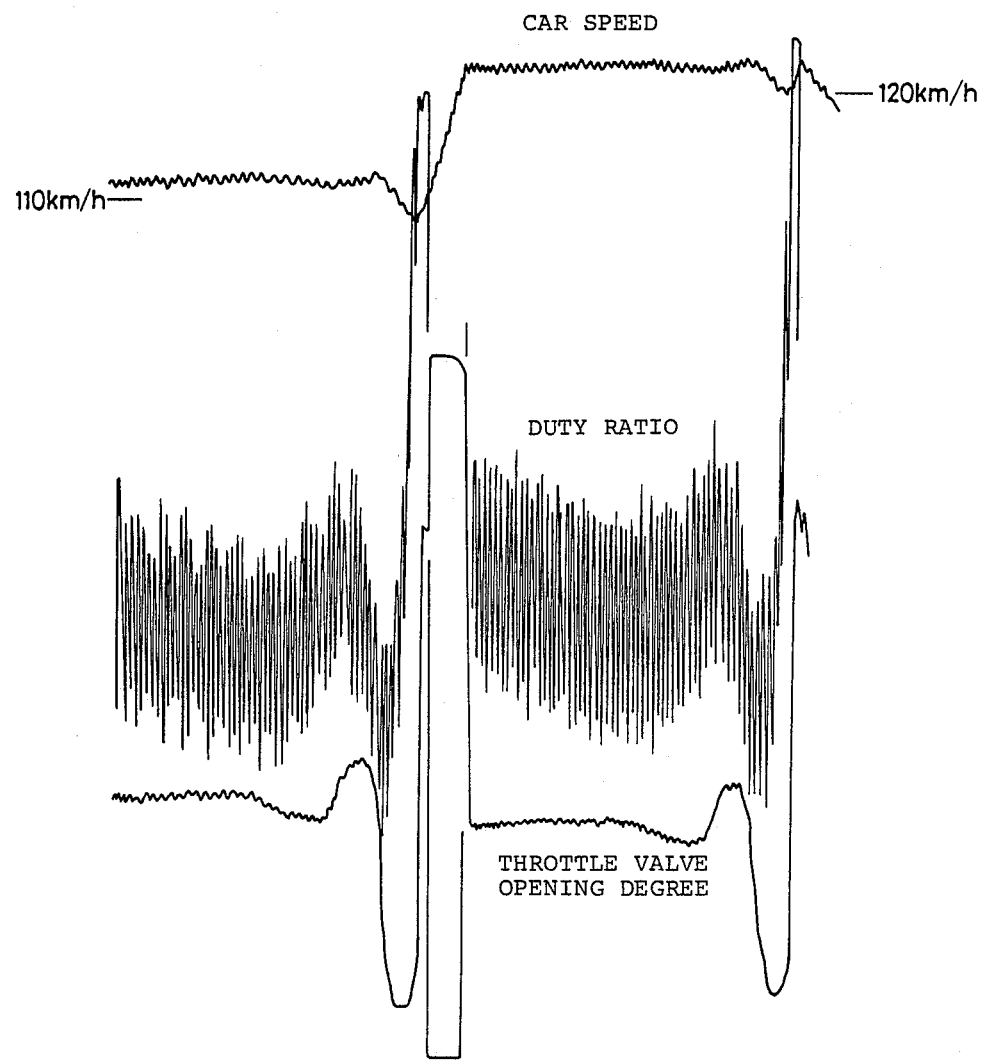
Figure 35:
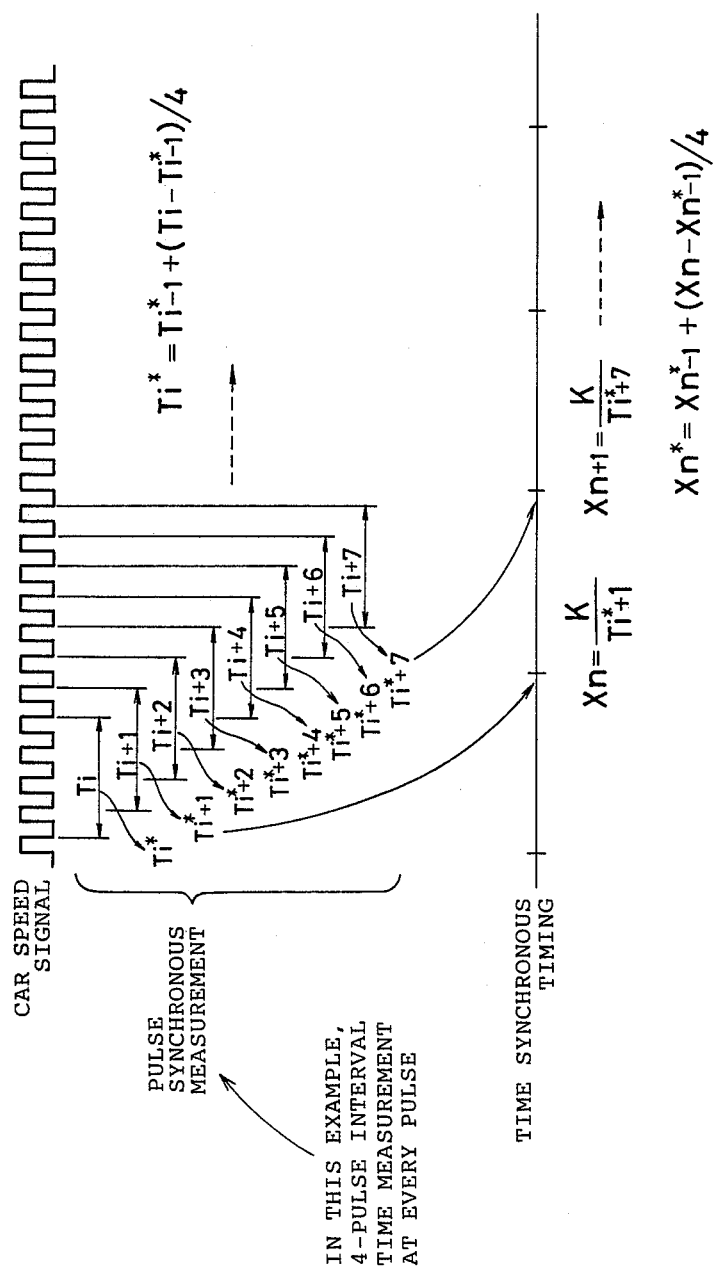
Figure 36:
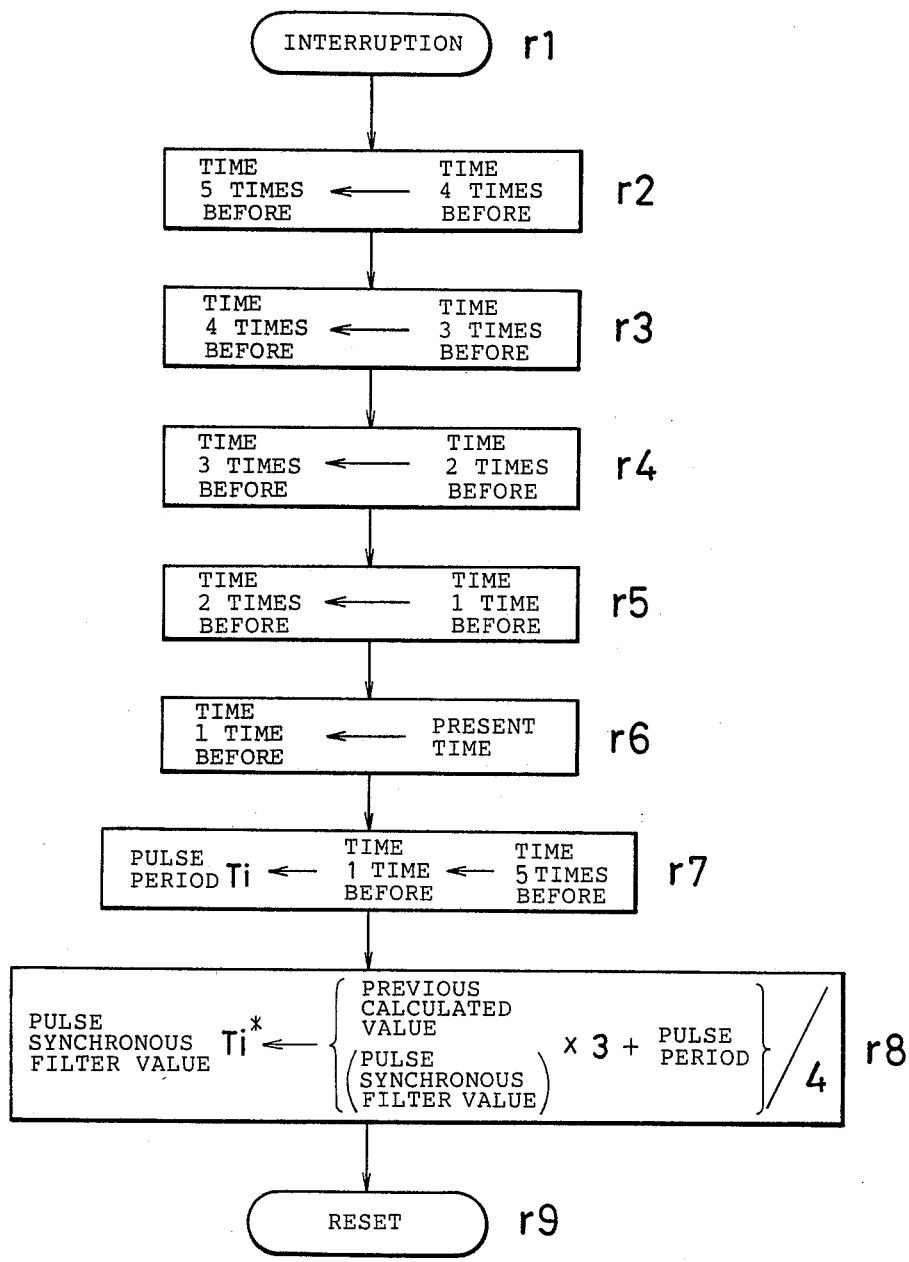
Figure 38:
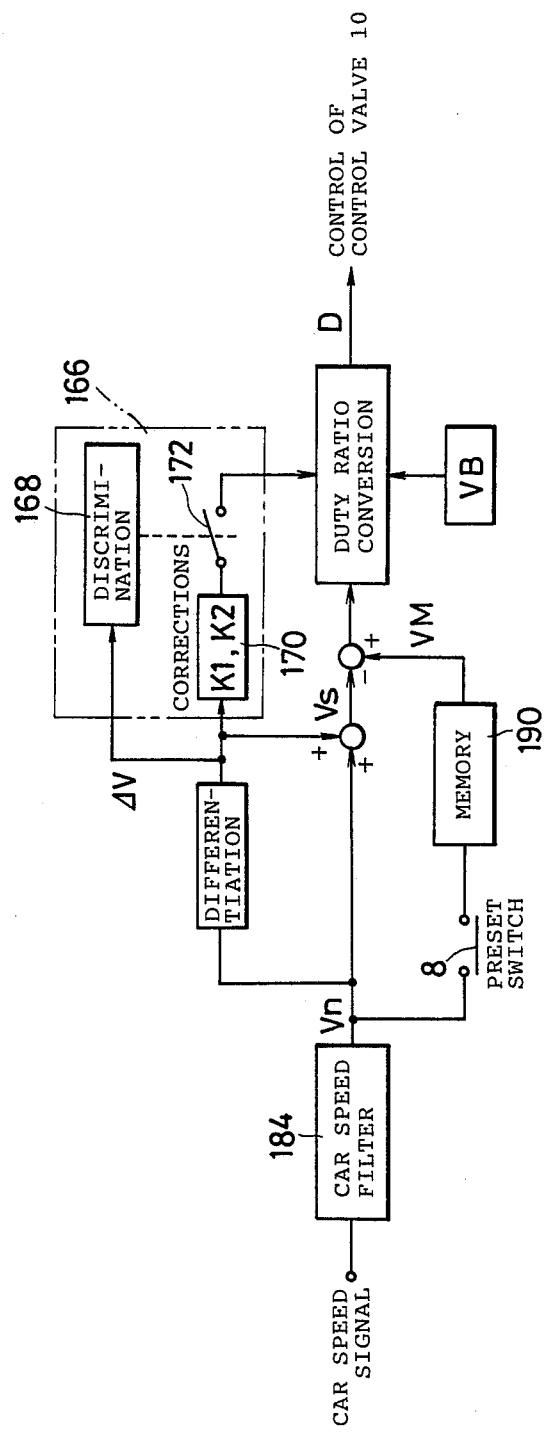
Figure 39A:
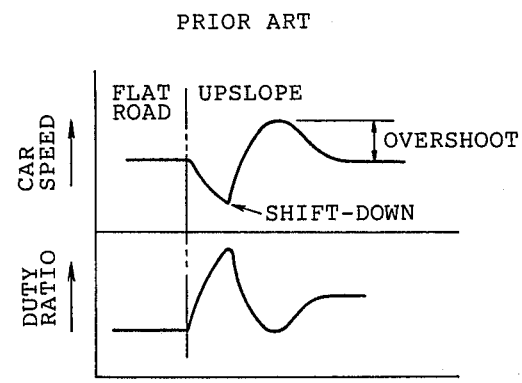
Figure 39B:
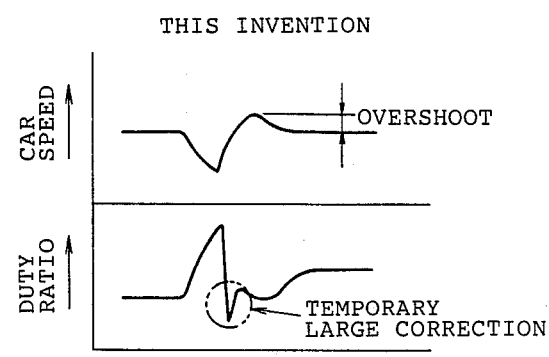
Figure 40:
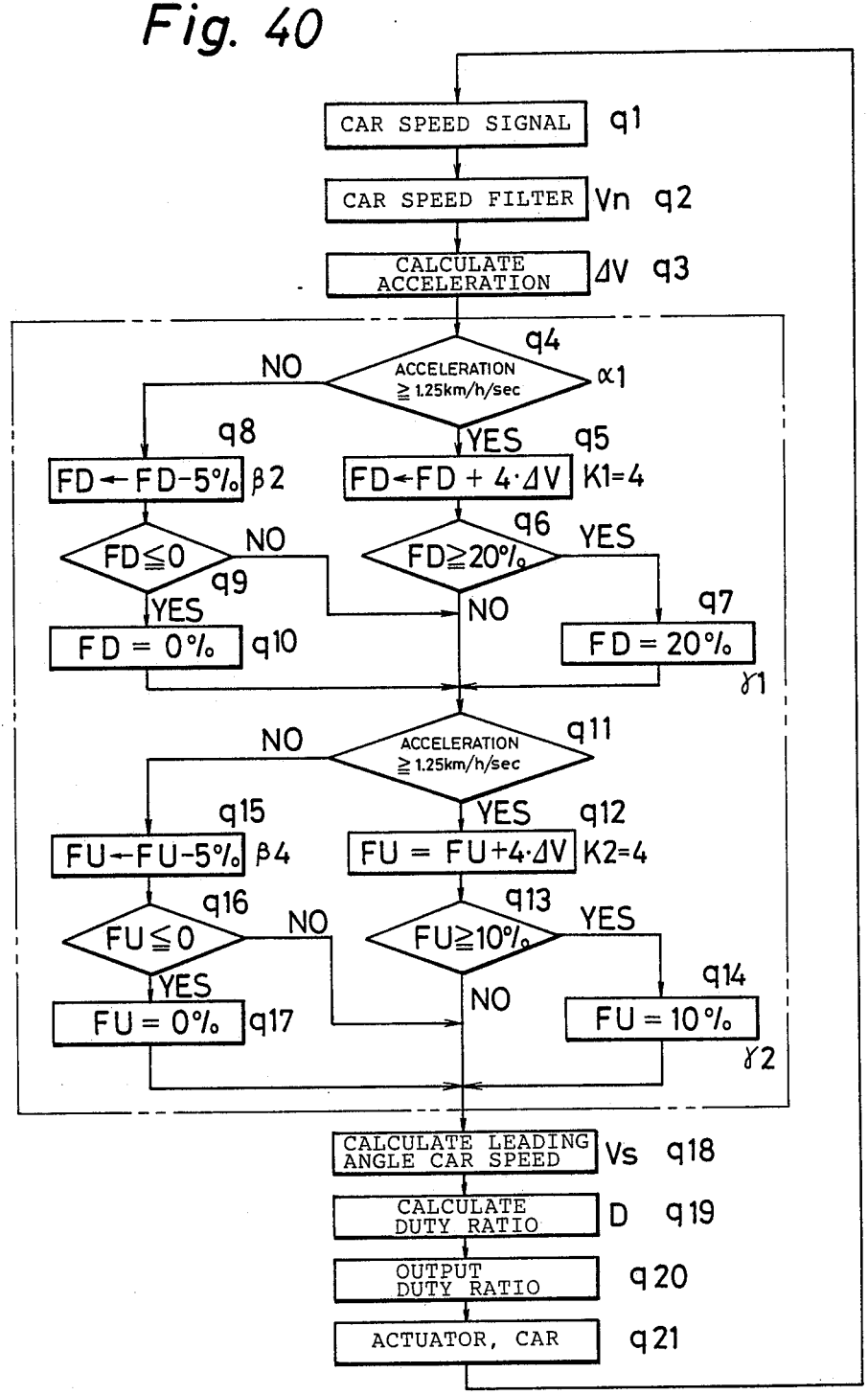
Figure 41:
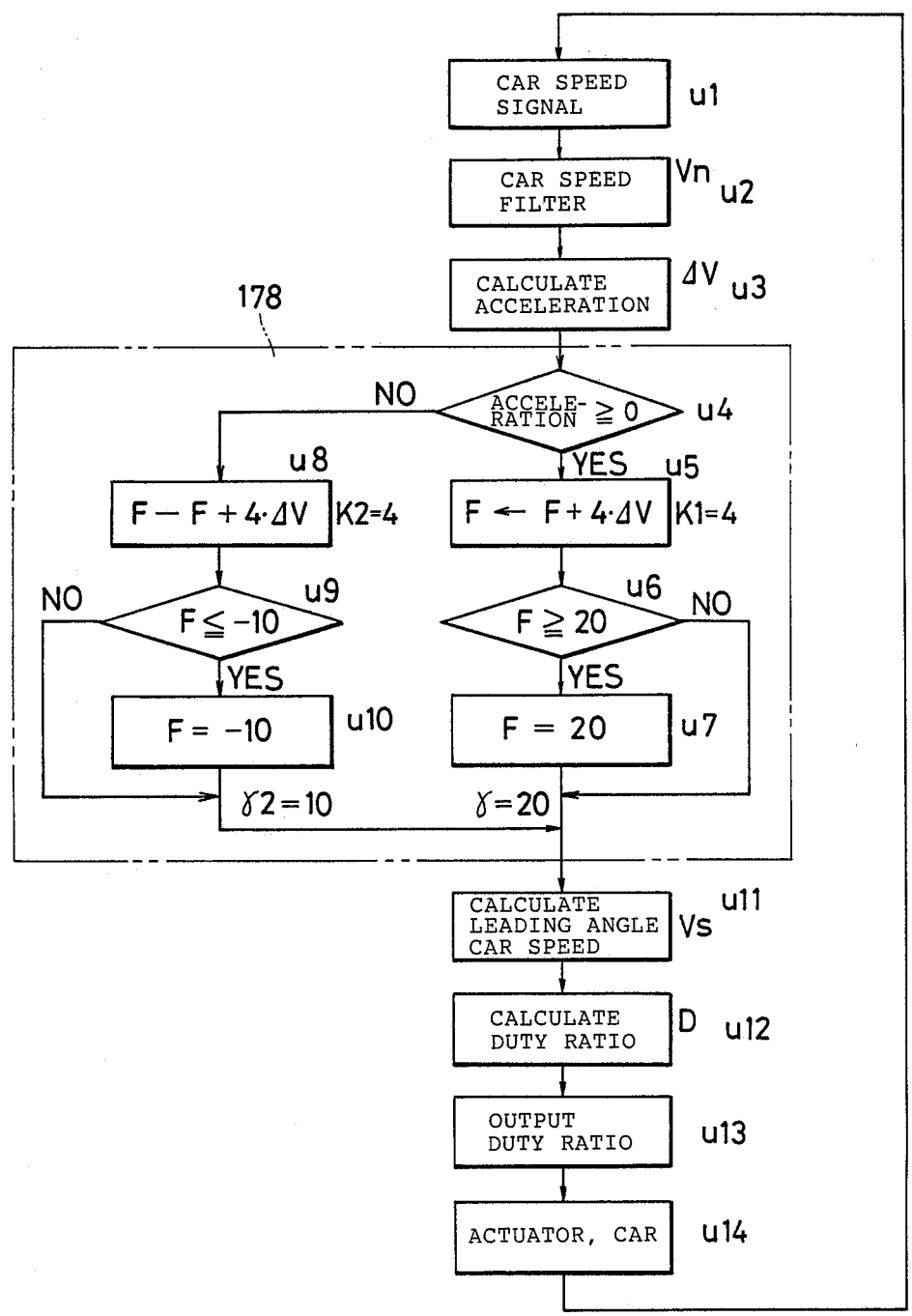
Figure 42:
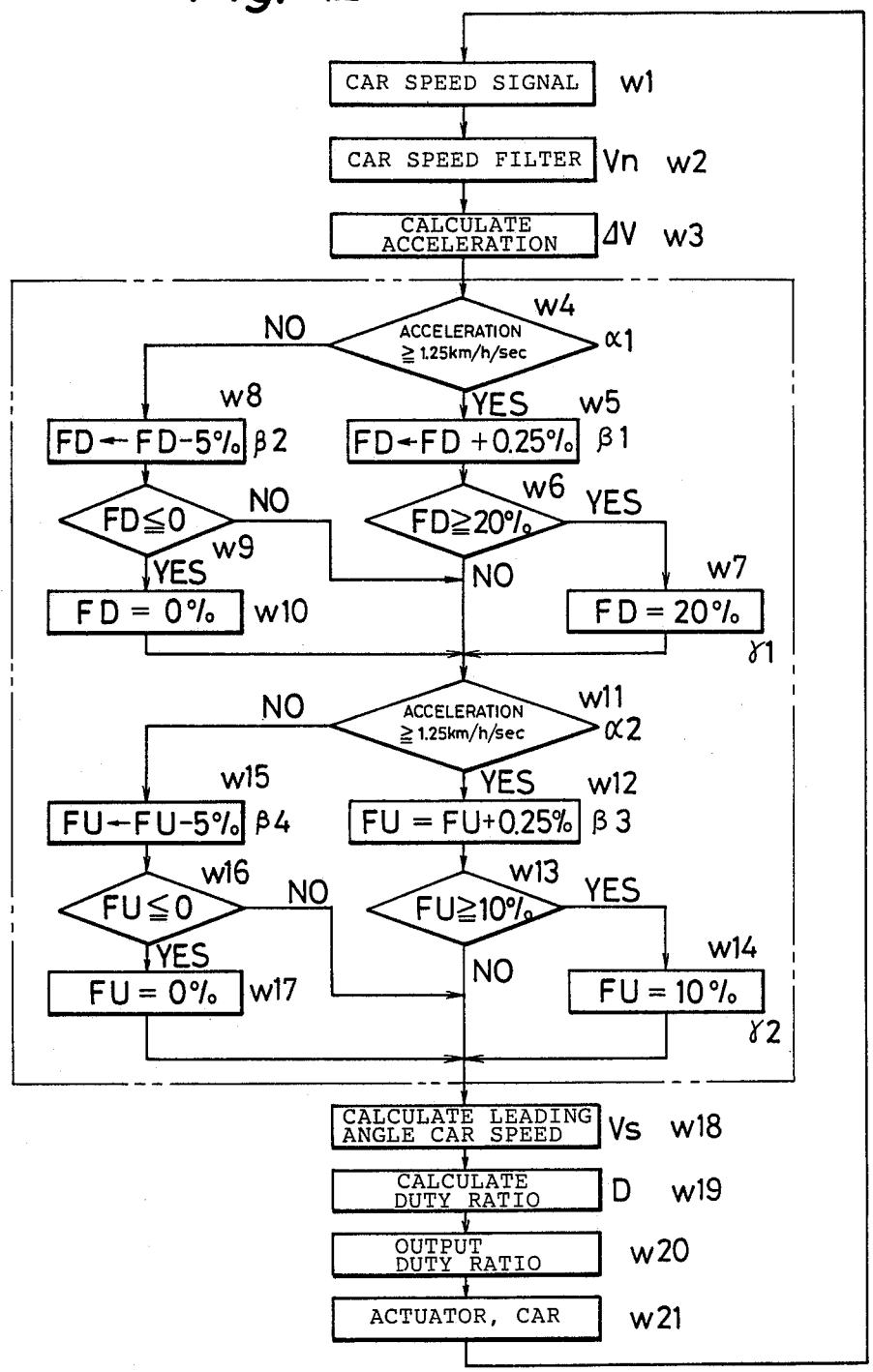
Figure 43:
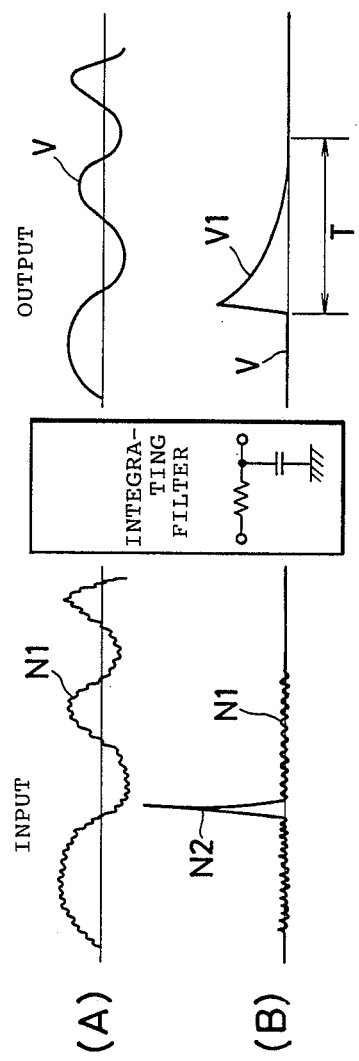

FIGS. 8(A) and 8(B) are graphs showing a relationship between the time transition of car speed and duty ratio in the prior art;

FIG. 9 is a drawing showing the car speed changes with the passing of the time in other prior art;

FIG. 10 is a block diagram showing one of the embodiments of this invention;

FIG. 11 is a block diagram used to explain the processing operation of a processing circuit 188 in FIG. 10;

FIGS. 12(A) and 12(B) are drawings showing the relationship between car speed and duty ratio used to explain the principle of this invention;

FIGS. 13(A) and 13(B) are drawings used to explain the operation of the embodiment of this invention;

FIGS. 14(A)–14(E) together form a flow chart to explain the operation of this invention;

FIGS. 15(A) and 15(B) are drawing used to show the relationship between car speed and duty ratio accompanying the passing of the time in an embodiment of this invention;

FIGS. 16(A) and 16(B) are drawings used to explain the dynamic control gain conforming to this invention;

FIGS. 17(A) and 17(B) are drawings used to explain the operation of an embodiment following the concept of this invention;

FIGS. 18(A) and 18(B) are drawing used to explain the operation of the embodiment of this invention in contrast with the prior art;

FIGS. 19(A) and 19(B) are waveform diagrams used to explain the operation of the above mentioned embodiment;

FIGS. 20(A)–20(C) together form a flow chart used to explain the operation of another embodiment of this invention;

FIG. 21, is block diagram used to show a control line of an embodiment of this invention;

FIG. 22 is a block diagram used to show another function of the control line in FIG. 21;

FIG. 23 is a graph used to show changes of a deviation z(t);

FIG. 24 is a block diagram used to show still another function of the control line in FIG. 22;

FIG. 25 is a graph used to show changes of the calculated value y(t);

FIG. 26 is a block diagram of a further different embodiment of this invention;

FIG. 27 is a general block diagram of this invention including the constitution shown in FIG. 26;

FIG. 28 is a flow chart used to explain the output duty ratio calculation and output processing in the embodiment shown in FIG. 26 and FIG. 27;

FIG. 29 is a flow chart used to explain the averaging processing action of the output duty ratio of the embodiment shown in FIG. 26 through FIG. 28;

FIG. 30 is a drawing used to explain the operation of the embodiment of this invention;

FIGS. 32(A) and 32(B) are drawings used to explain he operation of the embodiment shown in FIG. 31;

FIG. 33 is a drawing used to show the characteristics of leading angle control in accordance with this invention;

FIG. 34(A) is a drawing used to show the changes in the car speed, duty ratio and throttle valve opening with the passing of the time in a further different embodiment of this invention;

FIG. 34(B) is a time transition diagram of car speed, duty ratio and throttle valve opening according to the two-step differentiating method conforming to this invention;

FIG. 34(C) is a time transition diagram of car speed, duty ratio and throttle valve opening according to the one-step differentiating method;

FIG. 34(D) is a time transition diagram of car speed, duty ratio and throttle valve opening according to the two-step differentiating control method;

FIG. 35 is a drawing used to explain the car speed signal processing in an embodiment of this invention;

FIG. 36 is a flow chart used to explain the operation of an embodiment of this invention;

FIG. 38 is a block diagram of a further different embodiment shown in FIG. 28 in comparison with that of the prior art;

FIGS. 39(A) and 39(B) are drawings showing the operation of the embodiment shown in FIG. 38 in comparison with that of the prior art;

FIG. 40 is a flow chart used to explain the operation of a different embodiment of this invention;

FIG. 41 is a flow chart used to explain the operation of another embodiment of this invention;

FIG. 42 is a flow chart used to explain the operation of still a different embodiment of this invention;

FIG. 43 is a view used to explain the action in the prior art; and

Figure 44:
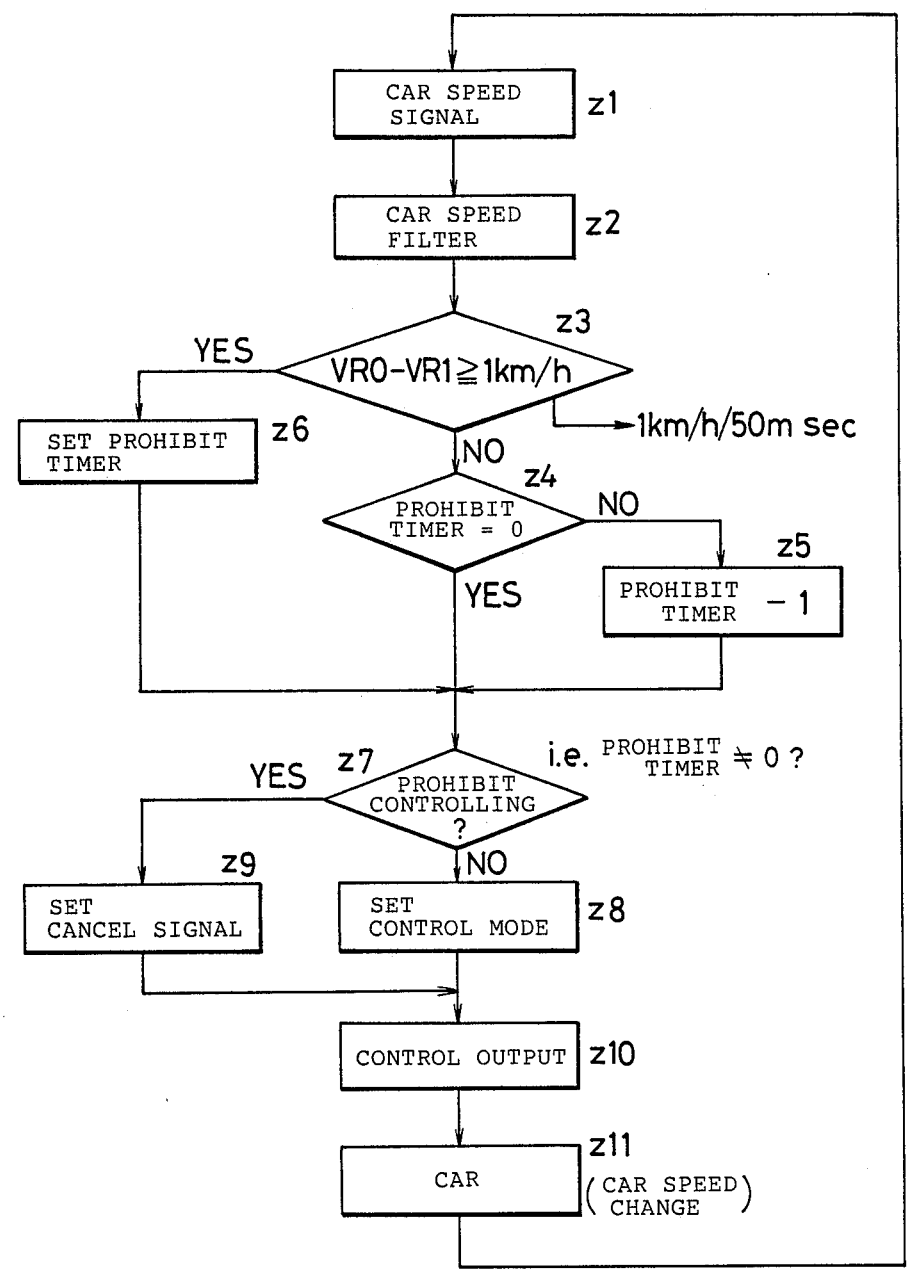

FIG. 44 is a flow chart used to explain the operation of still further different embodiment of this invention.

DETAILED DESCRIPTION OF THE PREFERRED EMBODIMENTS

Referring now to the drawings, preferred embodiments of the invention described below.

FIG. 10 is a system block diagram showing an example of a constant speed traveling control system following the aspect of this invention, in which a controller or ECU (electronic control unit) detects the car speed by a signal from a car speed sensor 6 having a reed switch 4 which is turned on or off by a magnet 2 rotating in proportion to the rotation of the vehicle drive shaft. The ECU stores the car speed when a present switch 8 is turned on, and, after it is turned off, controls the duty ratio of a control valve 10 of an actuator ACT. A pressure is lowered when the control valve 10 is turned on to increase the pressure generated by a diaphragm 12 linked to a throttle valve S1. When the control valve 10 is turned off, the atmosphere is introduced, and the pressure generated by a diaphragm 12 lined to a throttle valve S1. When the control valve 10 is turned off, the atmosphere is introduced, and the pressure generated by the diagram 12 is reduced. In this control period, a release valve 14 is turned on to shut off the atmosphere. When a cancellation signal (e.g. from a clutch switch 15; or in an A/T car, a neutral start switch, parking switch 16 or brake switch 18) is received, both control valve 10 and release valve 14 are turned off, and the atmosphere is let in both sides to stop the control swiftly. When a resume switch 20 is turned on after cancellation, control at the previously stored car speed is restored.

A microcomputer is used in the ECU, and processing in this unit is shown in a block diagram in FIG. 11. The output duty ratio D for on/off control of the control valve is determined by the difference between the target car speed VM stored in the memory and the car speed Vn, but it is not precisely Vn itself, but rather a skip car speed VS is used, which is Vn added to the car speed change component (differential component) outputted from a differentiation circuit 22 in an adder 24. This is intended to compensate for the loss time due to the time log of the action of the actuator ACT or hysteresis or play in the throttle valve SL or drive system, in a leaning direction. Therefore, the skip car speed VS is obtained by the following equation.

$$VS = Vn + K \times (Vn - V_{n-1}) \qquad (11)$$

where
   Vn: present car speed
   $V_{n-1}$: previous car speed
   K: proportional coefficient
The output duty ratio D is determined as follows.

$$D = G \times \Delta V + SD_0 \qquad (12)$$

where
   G: gain
   $SD_0$: set duty ratio
   $\Delta V$: car speed deviation $(= Vm - VS)$
In this preferred embodiment, this set duty ratio SD is variable, and can be expressed as:

$$SD = SD1 + (DM - SD1)/n \qquad (13)$$

DM is a high-speed integrating element which will quickly respond to changes in the duty ration, thereby reducing the set deviation. It operates on the principle that as illustrated in FIG. 12(A), the control line is made to rotate at high car speeds so that the deviation is decreased. On the contrary, SD1 is a low-speed integrating element which will respond slowly to changes in duty ratio and decrease the set deviation. Its operation strategy is to shift the control line in a parallel fashion in the direction of decreasing the deviation as indicated in FIG. 12(B).

For both DM and SD1, the initial value is equivalent to $SD_0$ in Eq. 2, and traces the path against the changes in duty ratio D as shown in FIGS. 13(A) and 13(B). FIG. 13(A) is an illustration of the operations when there is a drop in the speed of a car moving from a level to a uphill road (the duty ratio increased, while FIG. 13(B) illustrates the operation including a downhill. As shown in FIG. 13(A), when duty ratio D varies with varying car speeds, both DM and SD1 initiate changes. But since DM responds more quickly of the two, DM first follows up. SD1 later starts change, so that the overall SD1 changes like dashed line, and then merges with duty ratio D. This is because SD shifts from $SD_0$ to D=A, where the equation 6 becomes stabilized when V=0, and SD=A.

Using the equations 5 and 6, the output duty ratio D can be expressed as:

$$D = G \times \Delta V + [SD1 + (DM - SD1)/n] \qquad (14)$$

FIGS. 14(A)-14(E) together form a flow chart shown an embodiment of this invention. In this embodiment, a high speed integrating element Dm is changed in proportion to the difference from the duty ratio D. That is, at step s16, supposing $$DM(i) = DM_{(i-1)} + \alpha \qquad (15)$$

when present element DM(i) is change by from the previous $DM_{(i-1)}$, if this $\alpha$ is , for example, $$\alpha = [D(i) - DM_{(i-1)}]/K \qquad (16)$$

the difference between the present duty ratio D(i) and the previous element $DM_{(i-1)}$ is applied, and the correcting speed is varied (where K is a coefficient).

By contrast, a low speed integrating element SD1, is used a variable $\beta$ which is smaller than , expressed, at step s37, as follows $$SD1(i) = SD1_{(i-1)} + \qquad (17)$$

and when this B is a fixed value, the correcting speed is constant. For example, it is assumed:
   If, $D_{(i-1)} > SD1_{(i-1)}$, then $\beta = 0.2\%$ (18)
   If, $D_{(i-1)} < SD1_{(i-1)}$, then $\beta = -0.2\%$ (19)

In this way, when DM, SD1 at each point are determined, they are put into equation (13), and SD is calculated at steps s47, s48, or by putting into equation (12), the duty ratio D is calculated.

At step s49, a duty ratio D(i) is output, by which the actuator is controlled, sot that constant speed cruising is effected at duty ratio D(i). The calculation cycle at steps s2 to s49 is, for example 50 msec/1 cycle.

What is mentioned before is a basic construction of this embodiment, which further control the speed in accordance with various driving condition.

For a specified time (for example 12 sec) after the set switch is on, processing is at steps s3 to s4 just after setting which will be mentioned later. After 12 seconds have passed, processing is performed, passing steps s3, s23. At steps s23, a duty ratio deviation $\Delta D$ is determined by a difference between a set duty ratio SD (its initial value is $SD_0$) and the output duty ratio D, and depending on the size of the $\Delta D$, $\beta$ is determined so that SD is corrected at step s24 to s36.

Figure 1:
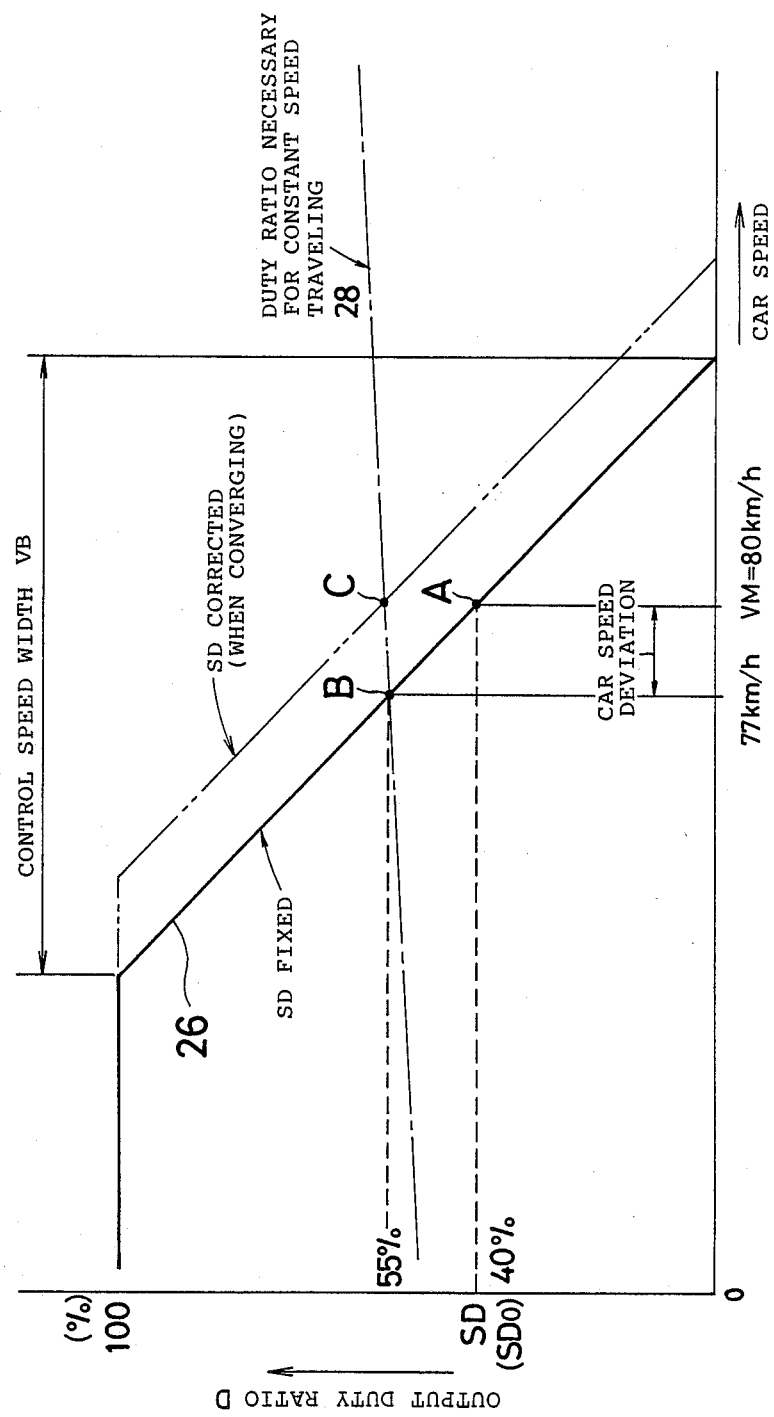
FIG. 1 is a drawing showing the relationship between car speed and output duty ratio D in a duty ratio control of the prior art.
Figure 2:
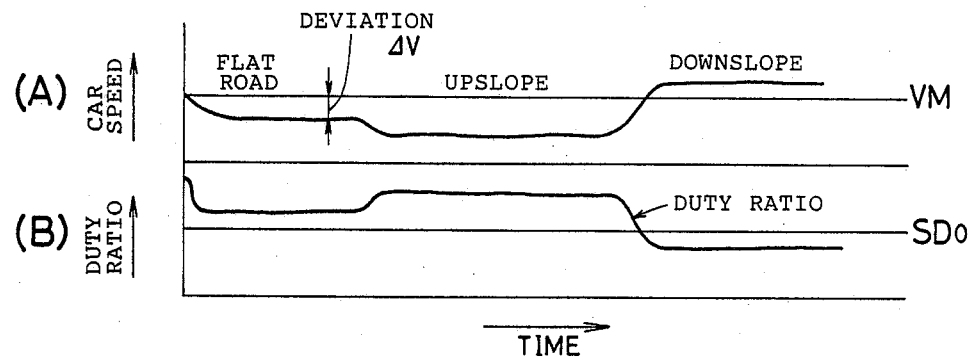
FIG. 2 is a drawing used to explain the operation of the prior art shown in FIG. 1.
Figure 3:
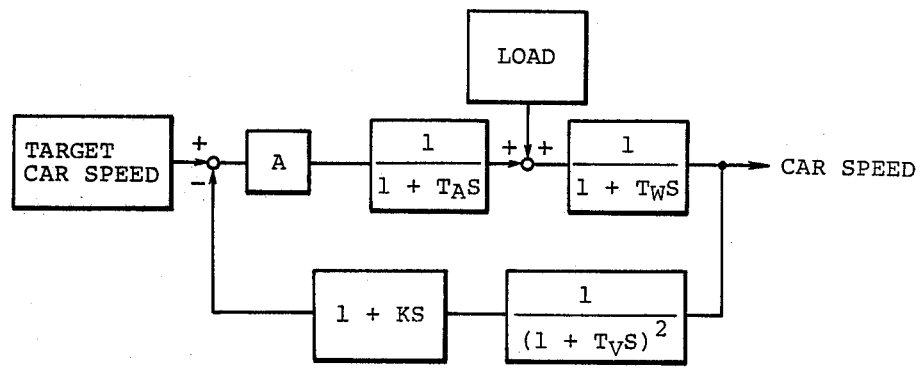
FIG. 3 is a block diagram of a constant speed cruise control system in the prior art.
Figure 4:
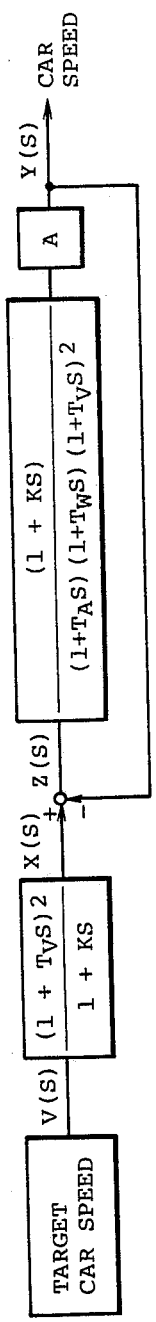
FIG. 4 is a block diagram of the system of FIG. 3, arranged regarding a target car speed.
Figure 5:
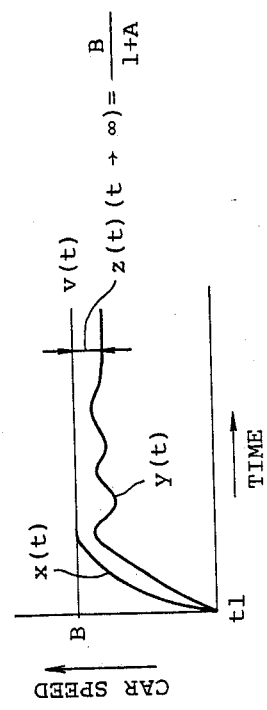
Figure 6:
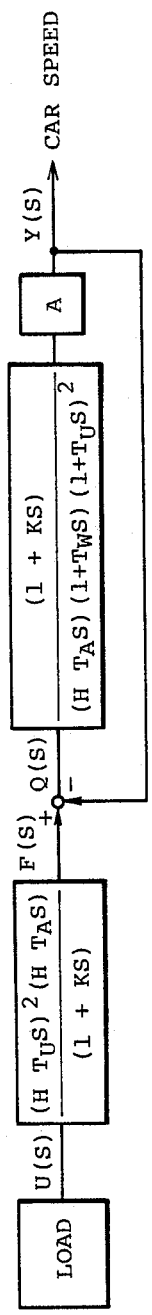
FIG. 6 is a block diagram showing the block diagram of FIG. 2, arranged regarding load.
Figure 7:
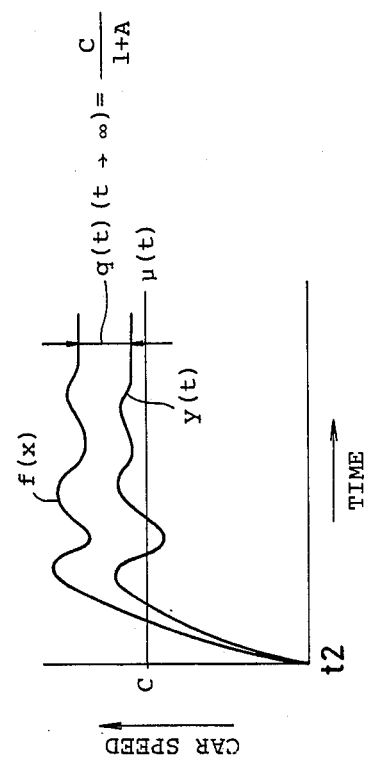
FIG. 7 is a drawing showing changes of a car speed in connection with the load.

In this method, as shown in FIG. 1, the control diagram is moved in a parallel fashion from the solid line (including points A,B) to the broken line (including point C), and thereafter the car speed has a car speed deviation of zero around point C.

In this embodiment, as shown in steps s25-s36, by dividing into several steps by the size of the difference $\Delta D$ (=SD-D) between the set duty ratio and output duty ratio D, integrating correction speeds are set individually. The setting method is based on the following three basic rules. [1] No correction is made where the $\Delta D$ is very small (for example, ±1%). This is a kind of dead zone, and it is intended to maintain stability by not making unnecessary correction while traveling stably. [2]. The correction speed is faster when the absolute value of $\Delta D$ is greater, that is, when the $\Delta D$ is large (i.e., the car speed deviation is large), the correction speed is raised to decrease the car speed deviation as quickly as possible, and when the car speed deviation becomes small, the correction speed is lowered to prevent excessive correction. [3]. If the absolute value $\Delta D$ is the same, the correction speed is varied between the increasing direction and the decreasing direction. For example, when the ΔD is over 20%, the correction speed (i.e., the SD decreasing direction) is greatly enlarged to decrease car speed overshoot when changing from upslope to downslope, thereby keeping the speed increase state to a minimum.

Meanwhile, discriminating by the difference ΔD of duty ratio as in this embodiment is the same as discriminating by the magnitude of car speed deviation, but to be more precise it is different from the point that the output duty ratio D is discriminated by the sum of the skip car speed VS and control speed width VB (which is a value used to express the gain of the ECU, electron control unit,) and as compared with the method of discriminating merely by the magnitude of car speed deviation, it is excellent in two points, that is: (I) a transient control amount is taken into consideration, and (II) it is discriminated by a duty ratio which directly influences the actual actuator line operation.

While within 12 seconds, $\beta$ is automatically determined in the quantitative relationship of D, SD and car speed region. that is, in a low speed region of 60 km/h or less, at steps s5, s7, s8, $\beta \pm 0.04\%/sec$, in which the plus sign refers to the case of D>SD, and the minus sign represent the case of D<SD. On the other hand, in a high speed region exceeding 60 km/h, at steps s6, s9, s10, it is only $\beta = \pm 0.2\%/sec$, and $\beta$ is determined regardless of the magnitude of D−SD. At this time, $\beta$ is intended to keep the integrating correction speed at a moderate constant value.

FIGS. 15(A) and 15(B) are used to explain the operation of this invention. By controlling the correction speed of SD 1 at a moderate constant speed until passing time T after setting, variations of other factors accompanying the duty ratio change may be arrested, so that hunting as shown in FIGS. 8(A) and 8(B) may be prevented.

At the time of determining $\beta$, ΔD may be defined not by SD−D, but by SD1−D.

According to the above, when $\beta$ is determined, SD 1 is calculated based on the equation (1) at step s37. However, in advance of that, at steps s11 to s15, a correction term of DM is determined corresponding to a car speed, the DM being calculated based on the equation (9), (10), that is when it is less than 60 km/h, the DM is calculated with [1] having K=512 at step s12, or when 100 km/h or more, Dm is calculated with [3] having K=64 at step s13, s14, and in the intervening zone, the DM is calculated with [2] having K=128 at step s14. When the value of K is varied in this way, the dynamic control gain changes as shown in FIGS. 16(A) and 16(B), so that the gain of the entire control system can be changed along with the variation of the vehicle gain.

Figure 14A:
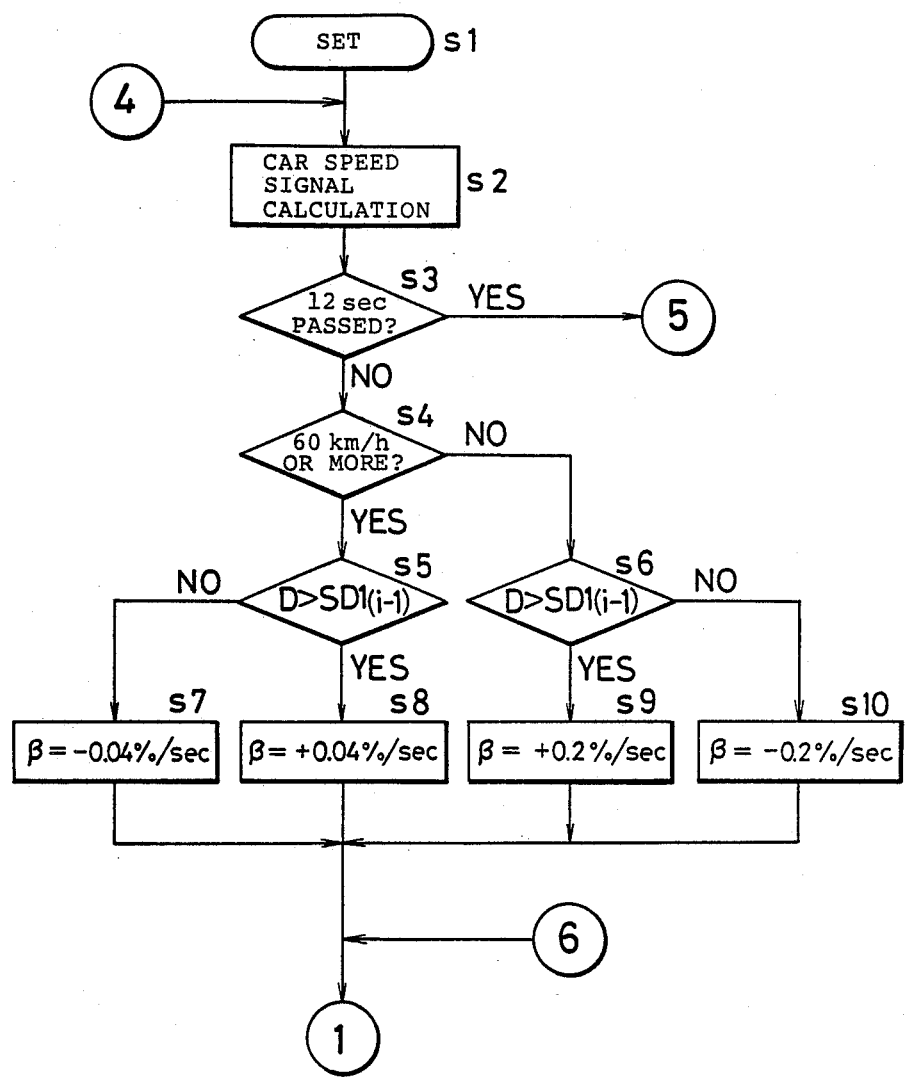
Figure 14B:
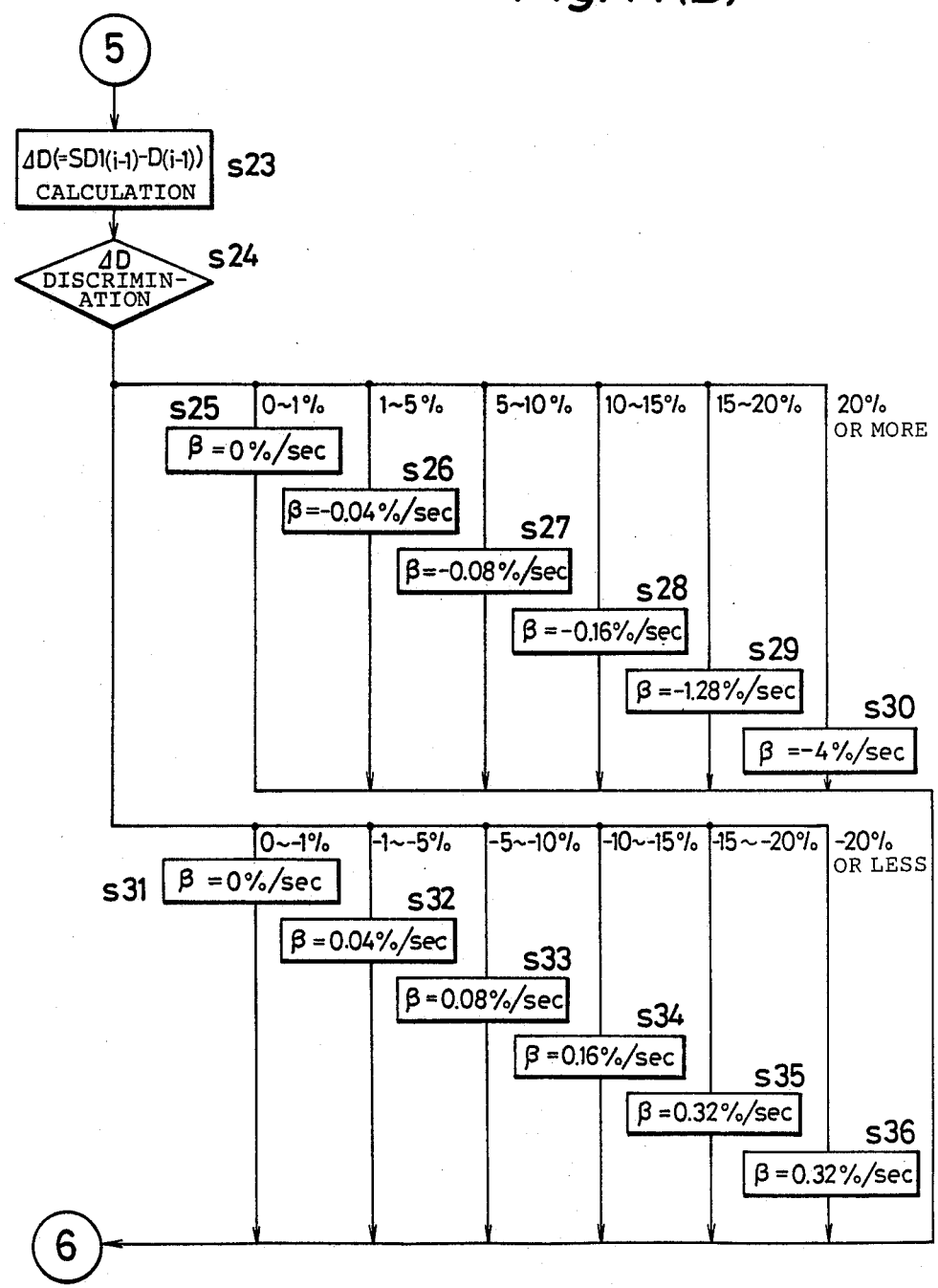
Figure 14C:
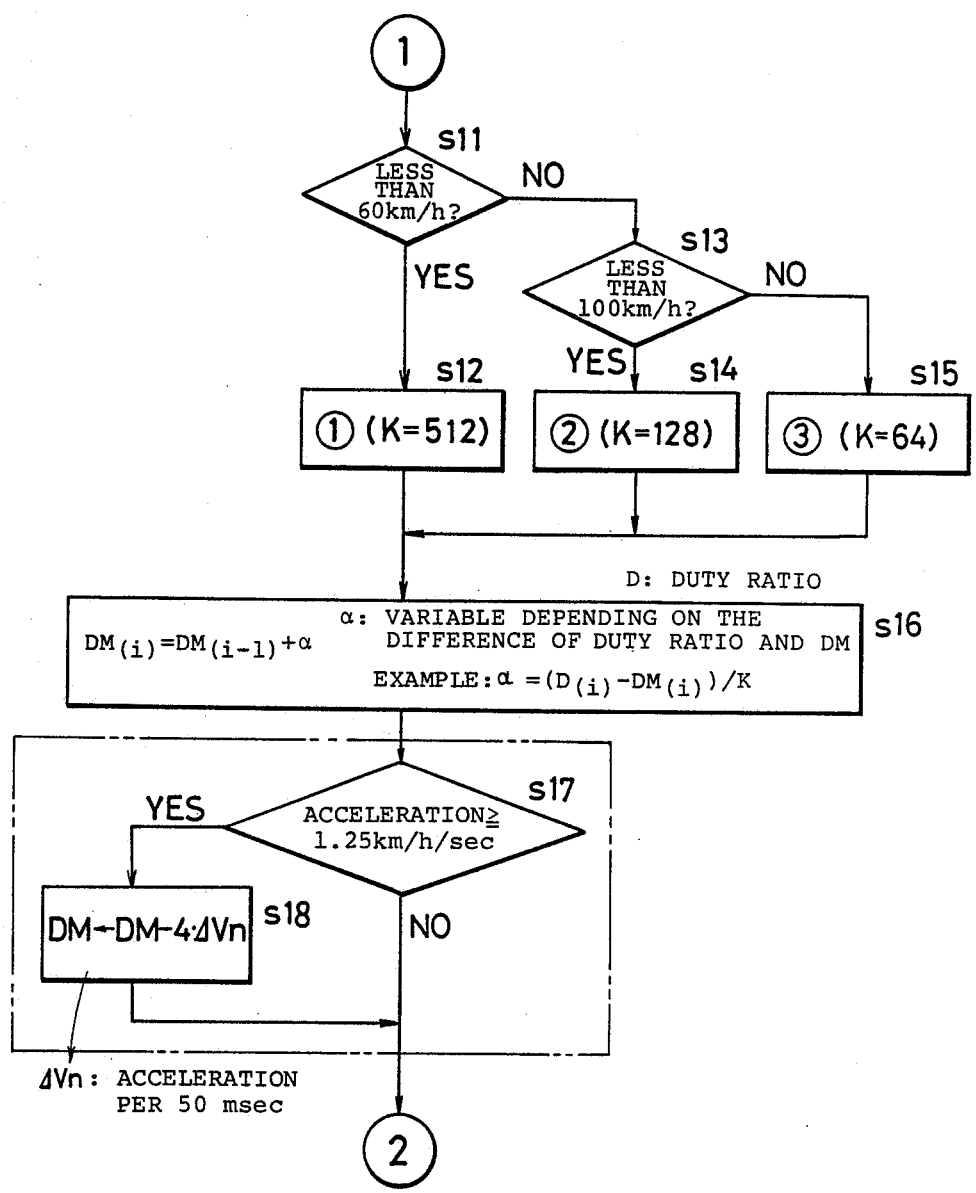
Figure 14D:
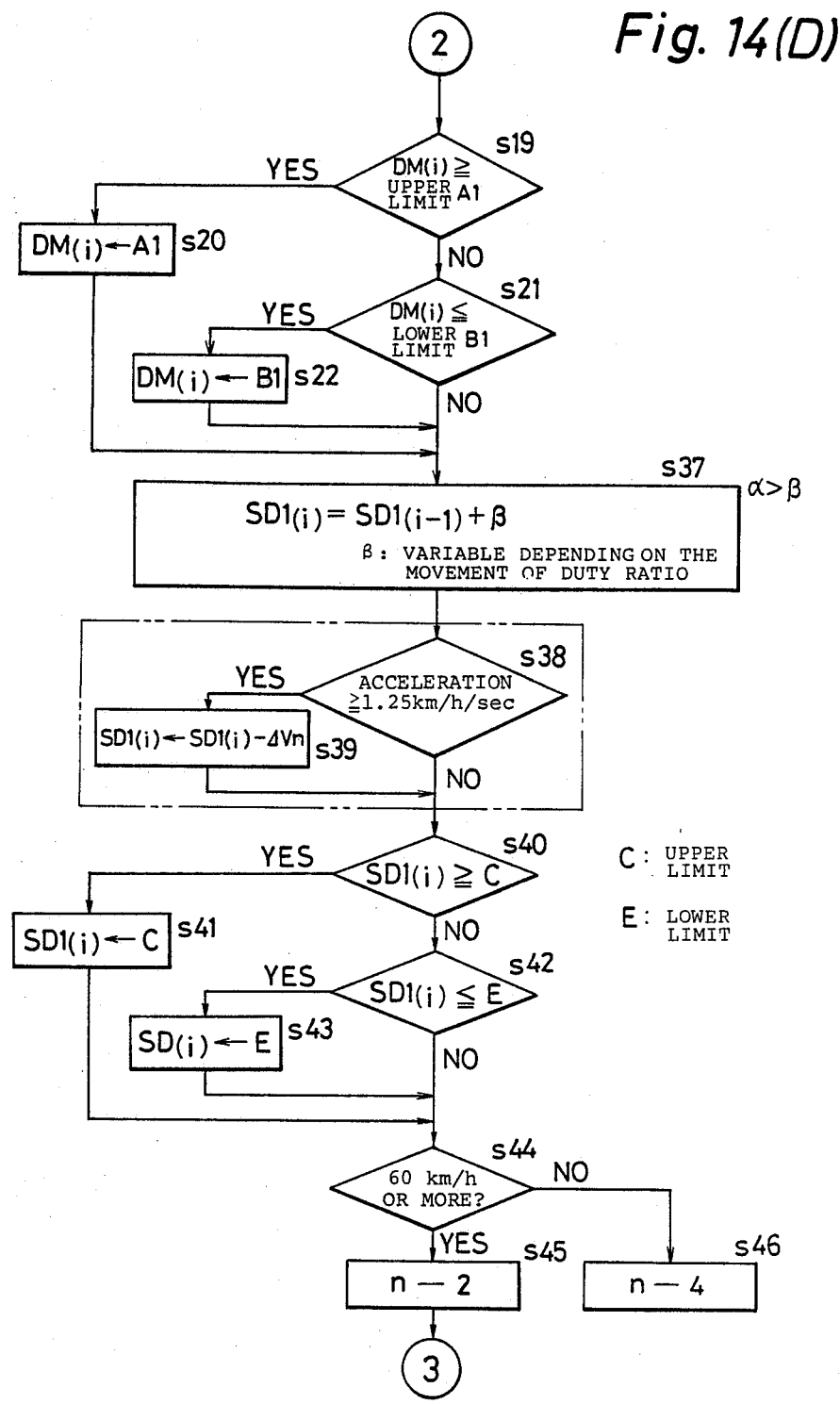
Figure 14E:
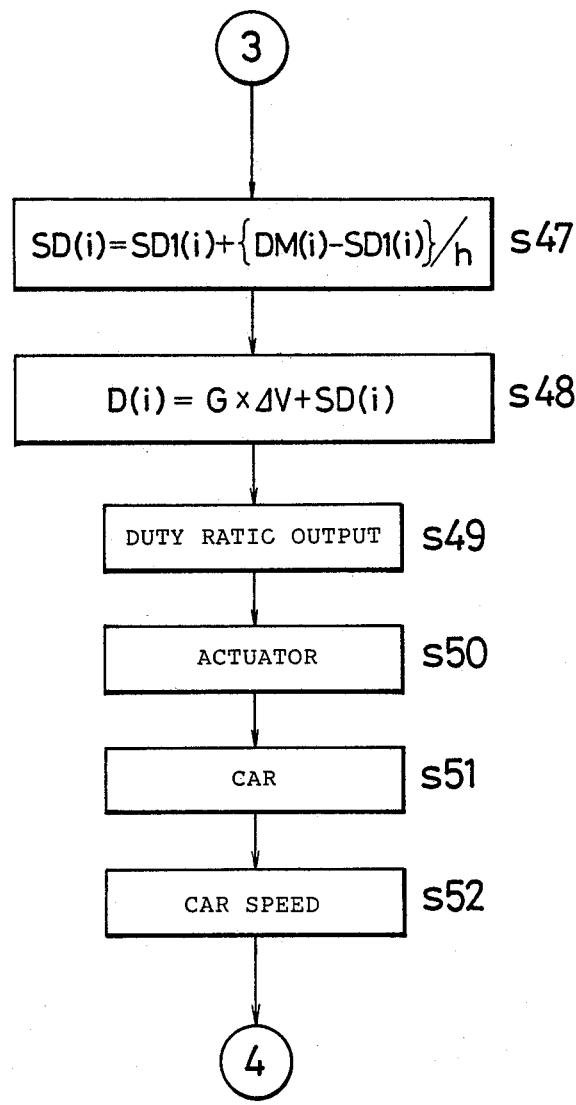

FIGS. 17(A) and 17(B) are waveform diagrams, in which the broken line denotes the characteristic omitting steps s22 to s15 in FIG. 14(C) and the solid line represents the characteristic with steps all to s15 in FIG. 14(C)

Meanwhile it is also possible to control more delicately by dividing the preset car speed into smaller section than in this embodiment.

Next, the processing represented by steps s17, s18; s38, s39 is described hereinbelow.

The processing performs quick changing DM and SD1 to make car speed change small when car speed acceleration is large, for example when passing from upslope to downslope. That is, if the acceleration ΔVn exceeds, for example, 1.25 km/h/sec, 4·ΔVn is subtracted from DM at step s18, and ΔVn from SD1 at s38. As a result, both DM and SD1 change suddenly. However, since the Vn takes the plus sign when t=accelerating, and the minus sign when decelerating, when the duty ratio is lowered, both DM and SD1 decrease, and when it is increased, both values increase.

FIGS. 18(A) and 18(B) explain this operation. More specifically, FIG. 18(A) shows the basic system of FIGS. 14(A)–14(E), that is, the constitution without steps s17, s18; s38, s39, while FIG. 18(B) is steeper than FIG. 18(A), which means that the car speed change may be suppressed to a small extent if the road surface gradient changes suddenly.

Thus, the processings at steps s19 to s22 and steps s40 to s43 are performed after the processing at steps s17, s18; s38, s39. This step limits the integrating range, which defines the range of the parallel movement of control line FIG. 1. Generally, when the duty ratio is under 20% or over 80%, the pressure generating by the actuator is saturated at 0 and maximum, respectively, and it is meaningless to correct the set duty ratio up to these ranges. If the correction range is slightly limited further, there may be slight effects on a steep slope, but it is a practically safe level. Accordingly, by limiting the set duty ratio correcting range, the car speed fluctuations due to sudden slope changes are restricted. Two setting methods of limiting range of set duty ratio are considered as follows.

(1) In the duty ratio type Auto Drive Unit, and average required duty ratio is set as initial set duty ratio (SD$_0$) Based on this SD$_0$, upper limit A1 and lower limit B1 are set. For example:

$$A1 = SD_0 - 10\% < SD < B1 = SD_0 + 20\% \tag{14}$$

(2) Tht limits are defined by the absolute value of duty ratio. For example:

$$A1 = 30\% < SD < B1 = 60\% \tag{15}$$

Both (1) and (2) may be established by the one-side limit only. For example:

$$A1 = SD_f0 - 5\% < SD < B1 = 60\% \tag{16}$$

At steps s19 to s22, the value of DM is limited by use of an upper and lower limit values A1 and B1. At steps s40 to s43, the value of SD1 is limited by use of an upper and lower limit values C and E which can be obtained in a same manner.

After the processings at steps s40 to s43, steps of s44 to s46 are performed.

According to the result of a car speed discrimination (60 km/h or not?) at step s44, the value of n is changed as n=2 (60 km/h or more) at step s45, and as n=4 (less than 60 km/h) at step s46. The value of n is a value for use at step s47 to calculate SD.

The value of n is arbitrary, but at n=1, the control line in FIG. 12(A) stand upright, and the gain becomes maximum. Then as the value of n increases, the gradient of control line becomes moderate (the gain decreases). Therefore, in FIGS. 14(A)–14(E) at 60 km/h or higher when the vehicle gain begins to drop, the dynamic control gain G1 is raised as n=2 at step s45, and at less than 60 kmm/h when the vehicle gain begins to go up, the dynamic control gain G1 is lowered as n=4 at step s46.

FIGS. 19(A)-19(C) are waveform diagrams, in which the broken line denotes the characteristic when omitting steps s44 to s46 in FIGS. 14(A)-14(E) and the solid line represents the characteristic with steps s44 to s46 in FIGS. 14(A)-14(E).

In this embodiment, meanwhile, only an example of varying the dynamic control gain G! in a low speed traveling region (for example, less than 60 km/h) is shown, but is is also possible to vary the dynamic control gain G1 (to decrease the value n) also in a high speed traveling region (for example, over 100 km/h). More delicate control is possible by dividing the preset car speed into smaller sections.

In accordance with SD1, DM and n obtained hereabove, at step s46, the set duty ratio SD is calculated, and next, at step s48, the output duty ratio D is calculated. A control signal corresponding to the duty ratio D is output to the actuator at step s49.

FIGS. 20(A)-20(C) show a different embodiment of this invention in which the set duty ratio Sd is corrected directly by $\beta$ at steps s24 to s36 of FIGS. 14(A)-14(E) without using DM and SD1. Steps s1 to s10 in FIGS. 14(A)-14(E) is rewritten as in FIGS. 20(A)-20(C). what is of note is that the value of SD is directly corrected depending on D (=SD−D) by as $$SDi = SD_{i\text{-}1} + \alpha \qquad (20)$$

and when $\Delta D$ is large, SD is correctly promptly. This value of SD is controlled in a range between upper limit A2 and lower limit B2 at steps 112 to 115. As this $\Delta D$ increases, the value of is set larger.

In a further different embodiment of this invention, instead of equation (50a) above=, Sdi may be corrected as shown in equation (53a).

$$SDi = SD_{i-1} + \frac{Di - SD_{i-1}}{K} \qquad (21)$$

The other constitution is same as in preceding embodiments.

A brief description will be given of the principle wherein car speed deviation does not occur, in the aforestated embodiment.

The improved control system of the constant speed cruise control is roughly as depicted in FIG. 21 if its non-linear element is disregarded.

FIG.22 is an illustration of this control system in relation to the target car speed.

Suppose that cruising is maintained with an actual car speed in complete agreement with the target value under a given condition, and also that the target value varies stepwise by B at a given time t1.

Another way of saying this is that the target car speed V(S) is given at B/S, and the target value X(S) transmitted to the feedback system tracks the variation path and converges to V(S) as depicted in FIG. 23. On the contrary, an actual car speed Y(Y) varies as in FIG. 23, but the final value of the deviation Z(S) between X(S) and Y(S) is given by:

$$\lim_{S \to O} X(S) S_1 + \frac{1}{G(S)A} = 0 \qquad (21a)$$

However,

-continued $$X(S) = \frac{B(1 + T_VS)}{S1 + KS}$$

$$G(S) = \frac{(1 + KS)(1 + T_fS)}{(1 + T_AS)(1 + T_WS)(1 + T_VS) T_fS}$$

This denotes that, whatever the target value, an actual car speed comes to merge with the target speed.

FIG. 24 describes the relationships between he control system and road load.

Here again, let us assume that cruising is kept up with the target car speed and the actual one being in complete harmony with each other. Assume assume that load changes stepwise by C at a given time t2. Expressed in other terms, a load U(S) is given C/S, and F(S) (the car speed variation corresponding to load changes) signalled to the feed back system varies as shown in FIG. 23, with the attendant change of Y(S).

What is noteworthy here is the fact that the car speed F(t) corresponding to load is rendered equal to zero at t-.

This can be seen from the fact that the final value of F(S) becomes zero as a result of the calculation using the following equation:

$$\lim_{S \to O} S F(S) = 0 \qquad (21b)$$

However, $$F(S) = \frac{(1 + T_AS)(1 + T_VS) T_fS}{(1 + KS)(1 + T_fS)} \cdot \frac{C}{S}$$

Also of note is that the final value of Q(S), a deviation between F(S) and Y(S), becomes zero.

This is to be recognized by the fact that the final value of Q(S) is given by the following formula and becomes zero.

$$\lim F(S) \cdot S \cdot \frac{1}{1 + G(S) A} = 0 \qquad (21c)$$

However, $$G(S) = \frac{(1 + KS)(1 + T_fS)}{(1 + T_AS)(1 + T_WS)(1 + RVS)^2 T_fS}$$

The above two finding denote that with the latest improvement, cruising speed is not affected by loads on a steady basis, and that as mentioned previously, the control system is constructed so that cruising is maintained with an actual car speed kept in agreement with the target value.

FIG. 26 is another embodiment according to the invention, and this invention presents a constant speed cruise control system comprising an output duty ratio calculating means 101 for calculating the output duty ratio D corresponding to the difference between a detected traveling car speed width for calculation of output duty ratio calculation and a set duty ratio, and a driving means 103 for driving a coil 102a for control valve in an actuator 102 for driving a throttle valve operating on a driving source of engine negative pressure by generating a pulse signal possessing a duty ration corresponding to an output duty ratio calculated in this output duty ratio calculating means 101, in which are also corrected an average calculating means 194 it determine the average if output duty ratio calculating means 101, and a set duty ratio correcting means 105 for obtaining a set duty ratio for calculation of output duty ratio of output duty ratio calculating means 101 by correcting set duty ratio (fixed value) predetermined according to he average of output duty ratios calculated by the average calculating means 104.

It the predetermined set duty ratio is improper, the actual car speed contains the target car speed and stationary deviation, but at this time, a difference depending on the stationary deviation occurs between the average of output duty ratios and the set duty ratio, and the set duty ratio to be applied to the output duty ratio calculating means 101 is corrected in a direction to decrease the stationary deviation by the set duty ratio correct time means 105, so that the stationary deviation is controlled small.

According to this invention, if the predetermined set duty ratio is improper, the set duty ratio for calculation of output duty ratio is corrected by the output duty ratio calculating means in a direction to decrease the stationary deviation by the set duty ratio correcting means, so that the stationary deviation may be reduced, and moreover since it is not necessary to vary the control speed width, the stability is not sacrificed.

FIG. 27 is a lock diagram of essential parts showing concretely the system of FIG. 26.

In this drawing, number 80 is a read switch for the detection of the speed of an automobile, and 81 is a permanent magnet which is rotated by being driven by a speed meter cable. The reed switch 80 is turned on and off by the rotation of the permanent magnet 81, and generates a pulse signal having a frequency proportional to the car speed. This pulse signal is applied to a frequency-voltage converter (F/V converter) 82 to be converted in a DC voltage possessing a level proportional to the car speed. The output voltage of the F/V converter 82 is held in a memory circuit 84 when an analog switch 82 is turned on. The set voltage held in the memory circuit 84 is fed into a differential amplifier 85, where the difference form the output voltage form the F/V converter 82, that is, the traveling car speed, is obtained. This difference signal is converted in a digital value in an A/D converter 86, and is fed into the input port of microcomputer 87. The microcomputer 87 is used to generate a pulse signal possessing an output duty ratio depending on the difference signal, and the pulse signal, while an AND circuit 96 is opened, passes through this AND circuit 96 and is applied to a control valve coil 89*i* of an actuator 89 through an amplifier 90.

The actuator 89 comprises a control valve 89*a* and a release valve 89*b*, and the control valve 89*a* is opened or closed by the control valve coil 89*i* which is excited by the output of the amplifier 90. then as the control valve coil 89*i* is energized the atmospheric pressure from port 89*c* is cut off, and an intake pipe negative pressure from port negative pressure from port 89*d* is led into a chamber 89*e*, and when the energization is cut off, the negative pressure form the port 89*d* is cut off, and the atmospheric pressure form the port 89*c* is led into the chamber 89*e*. The release valve 89*b* is opened and closed by a release valve coil 89*j* which is driven by the output of a self-holding circuit 92 through an amplifier 91, and when energized, it cuts off the atmospheric pressure form port 89*f*, and when energization is turned off, it introduces this atmospheric pressure into the chamber 89*e*. As the pressure in the chamber 89*e* is controlled in this way, a diaphragm 89*g* moves, so that a rod 89*h* which is linked to an accelerator line (not shown) is mode in the axial direction, thereby controlling the opening degree of throttle valve SL.

There is an AND circuit 95 which receives the output of preset switch 8 and the output of high speed limit circuit 94, and by the output of this AND circuit 95, the analog switch 83 is closed, and the self-holding circuit 92 is preset. As the self-holding circuit 92 is present, another AND circuit 96 is opened, and the release valve coil 89*j* is energized through the amplifier 91, so that traveling control is enabled. The high speed limit circuit 94 is designed to close the AND circuit 95 when receiving a signal telling it that a particular speed has been exceeded, for example 100 km/h, so as to prevent the storing operation of the set car speed. A cancellation switch 98 is a switch used to reset the self-holding circuit 92, and when reset, the self-holding circuit 92 stops energization through the amplifier 91. A resume switch 97 is intended to rescue the constant speed control once interrupted by the cancellation switch 98, and when it is pressed, constant speed control is effected on the basis of the previous set car speed used as the target speed. Meanwhile, a low speed limit circuit 99 is intended to force the reset of the self-holding circuit 92 when the car speed drops below, for example, 30 km/h.

FIG. 28 is a flow chart showing an example of calculation and output processing of output duty ratio executed by the microcomputer 87, and FIG. 29 is a flow chart showing an example of an averaging processing of the output duty ratio executed by the microcomputer 87, which is described below.

The microcomputer executes steps s2 to s4 for the calculation of the duty ratio as shown in FIG. 28 in a specified period, for example, at every 50 msec (S1). In this processing, first difference between the output of the A/D converter 16, that is, the detected car speed XN and the target car speed XA stored in the memory circuit 84 (the car speed difference) is read (S1), and the present output duty ratio DU is calculated in the following equation (S3).

$$DU = [(XA - XN/VB] + SD1 \tag{22}$$

However, $$0 \leq D \leq 100$$

where VB is a control speed width, and SD is a set duty ratio for the calculating of the output duty ratio, and this SD is variable in this invention. The steps s2–s3 correspond to the output duty ratio calculating means 101.

The microcomputer 87, after calculating the present output duty ratio D at step s3, delivers a pulse signal possessing a duty ratio equal to that duty ratio to the AND circuit 96 through output port (S$).

At the time, the microcomputer 87, by executing the processing shown in Fr. 29 at every, for example, 50 msec, is always correcting the set duty ratio SD used in the calculation of the output duty ratio. that is, every time the correction period comes around, the means D mean of a new output duty ratio is calculated in the following equation from the mean D mean of the previous output duty ratio and the output duty ratio D at that time (S10).

$$D\ mean = (M \times D\ mean + D)/(M + 1) \tag{23}$$

where M is an averaging coefficient (a normalizing coefficient), and is, for example, 7. This step s10 corresponds to the mean value calculation means 104 in FIG. 26.

The microcomputer 87 calculates the mean Dmean of output duty ratio, and also calculates the set duty ratio SD for calculating a new output duty ratio in the following equation (24) (S11).

$$SD = SD_0 + (Dmeans - SD_0)/K \quad (24)$$

where $SD_0$ is a value determined in the designing state, corresponding to the conventional set duty ratio, and is a fixed value preliminarily stored in the read only memory of the microcomputer 87. Incidentally, K is a coefficient used for substantially determining the variable width of set duty ratio SD for calculation of output duty ratio, and it is set at, for example, about 2. This step s11 corresponds to the set duty ratio correcting means 105 in FIG. 26.

In this embodiment, since the set duty ratio Sd for calculation of output duty ratio is corrected on the basis means Dmean of output duty ration in every specified period as shown above, if, for example as shown in FIG. 30, there is a speed deviation of XN in the control by the initial fixed set duty ratio $SD_0$, the output duty ratio D is corrected toward the Dmean depending on the difference between $SD_0$ and the mean Dmean of output duty ratio at that time, and the characteristic curve of the car speed difference with respect to the output duty ratio is revised, for example, from the solid like to the dotted line shown in the same diagram, so that the stationary deviation is decreased as XN1.

In a system where plural fixed set duty ratios are set at every target car speed, they may be individually corrected.

FIG. 31 is a block diagram showing a calculation part of leading angel car speed, in which number 150 is car speed signal processing part, 152 is a preset switch, 153 is a set car speed memory unit, 154 is an output processing part, 155 is an a tutor, 156 is a primary differentiator, and 157 is a secondary differentiator. In this embodiment, the input car speed f(t) is differentiated in the differentiator 156, and is multiplied by a coefficient K1 in a coefficient multiplier 160, while it is further differentiated in the differentiator 157 and multiplied by another coefficient K2 in a coefficient multiplier 162. therefore, the leading angle car speed g(t) obtained by adding them up in an adder 158 is as follows.

$$g(t) = f(t) + K1 \cdot f'(t) + K2 \cdot f''(t) \quad (25)$$

The third term of the right side of the above equation is the portion not found in the conventional system and it is part B shown in FIG. 21(A). This part B is effective to cancel and nullify the overcompensating part A due to the second term of the right side of the above equation.

FIG. 33 is a leading angle characteristic drawing of this invention, assuming $K1 = 1.8$, $K2 = 1.8 \times 0.6$, in which the leading phase has been extended up to 180°. Accordingly, a sufficient phase leading time can be maintained up to a high frequency region.

The operational waveform diagram of this case is shown if FIG. 34(A), in which the car speed is increased from 40 km/h at 5 km/h increments at high gain. As is clear form the figure, the absolute amount of hunting is small, and difference is converged in a short time.

Meanwhile, to alleviate the duty ratio variations, the moving average of the high order differential term may be taken. That is, the leading angle car speed calculation in the microcomputer is performed as $$VSn = VRn + K1(VRn - VR_{n-1}) + \\ K2[(VRn - VR_{nn-1} - VR_{n-2})] \quad (26)$$

where
VSn: leading angel car speed
VRn: traveling car speed at measuring point
K1: coefficient of primary differential term
K2: coefficient of secondary differential term
and for example, employing the two-time moving average method, by setting the third term of the right side of the above equation is set as $$K2[(VRn - VR_{n-1}) - (VR_{n-1} - VR_{n-2}) + \\ (VR_{n-1} - VR_{n-2}) - (VR_{n-2} - VR_{n-3})]/2 \quad (27)$$

so that the duty ratio variations can be lessened. In this case, supposing the calculating cycle as 50 msec, it approximately follows that $K1 = 36$, $K2 = 216$.

The above explanation relates to the basic action with the coefficient K2 of the secondary differential term being constant, and in this invention, this coefficient K2 is further varied depending on the set car speed. An example is shown in FIG. 33(B). This diagram shows the characteristic of lowering the coefficient K2 gradually form the initial value of TK2 if the set car speed (VMM) exceeds a specified value (in this example, 40 km/h). IN this case, K2 is, assuming $TK2 = 1.08$ sec$^2$, expressed as follows $$K2 = TK2 - 0.015 \text{ sec}^2/\text{km/h} \times (VM - 40 \text{ km/h}) \quad (28)$$

and K2 is 0 at $VM = 124$ km/h.

Besides, other methods are possible, such as the method of lowering the value of K2 in steps, for example, in two steps, that is $K2 = TK2$ in a slow speed region under $VM = 80$ km/h, and $K2 = 0$ in a high speed region over $VM = 80$ km/h.

FIG. 34(B) refers to a case of constant speed traveling in a high speed region with the value of K2 in equation (25) being fixed. If there is disturbance in the car speed signal in such a case, the duty ratio changes significantly. The change of this duty ratio is larger than in the conventional case shown in FIG. 34(C), which indicates the shortcoming of adding a secondary differential term. However, when K2 is set smaller in high speed region, the effect of the secondary differential term is lowered, and the variation width of duty ratio becomes narrow as shown in FIG. 34(D), so that the stability control is maintained.

FIG. 35 is a schematic drawing showing how the car speed sensing portion works, wherein l of the following equation 29 and m of the equation 30 are both set at 4 and the time synchronizing timing at 50 msec.

$$Ti^* = T^*_{i\text{-}1} + (Ti - T^*_{i\text{-}1})/l \quad (29)$$

$$Xn^* = X^*_{n\text{-}1} + (Xn - X^*_{n\text{-}1})/m \quad (30)$$

where

T*: the time filtered by the equation 29,
X*: the car speed filtered by the equation 30, and
Vn: the traveling car speed at n.

The processing operation in this preferred embodiment is done by a processing circuit.

The pulse cycle Ti* can be determined from the step r1 to r9 in the flowchart in FIG. 36. Each pulse of the car speed signal is used as an interruption signal. The process is interrupted (at step r1) every time the rise of an edge of the car speed signal pulse is sensed, and the interruption time is read and the time data previously read and stored are shifted one by one (step r2, r3, r4, r5 and r6). Expressed in other words, the processing circuit, which is comprised of a central processing unit (CPU), a timer connected to the CPU through a bus line, a random access memory (RAM), a read only memory (ROM) and other devices, reads the interruption time into the CPU register in response to the clock pulse from the time each time interruption conditions are set out (at step r1). The last fifth to preceding time data (interruption time) stored in each address from N+4th to 4th in the RAM is rotated one after another; the time data most recently picked up is stored in the Nth address as the latest time, thereby performing processes r2 through r6. The pulse cycle Ti is calculated (step 7) by subtracting the last fifth time data registered in the N=rth address of the RAM from the last one stored in the Nth address. Using the preceding pulse cycle filter value $T^*_{i-1}$ and the latest cycle value Ti, the latest filtered pulse synchronization value $T^*_{i-1}$ is computed (step r8) with the equation 22 (1=4), and stored into the specified address. This filtered pulse synchronization value Ti is determined and updated at each rising of a car speed pulse signal, maintaining the latest pulse cycle filtered value Ti in a specified address of RAM. At the completion of the computation of the pulse cycle filtered values, this interruption process is put to an end and the main process is resumed (step r9).

Figure 37:
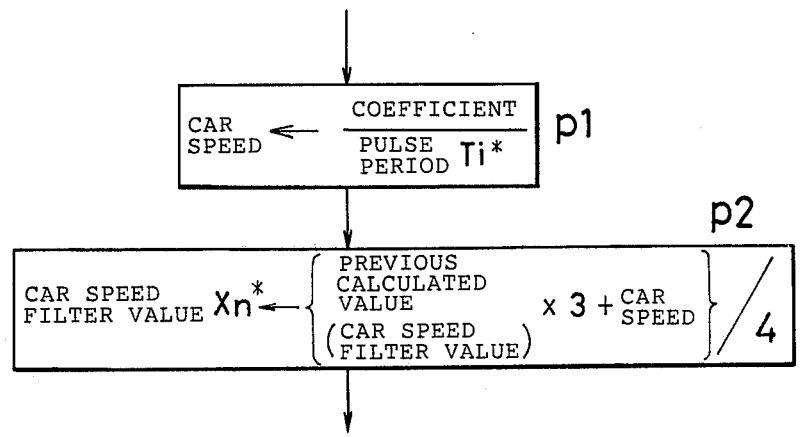

The car speed filtered value Xn* is determined using the step P1 and P2 in the flowchart of FIG. 37. This process indicates detailed car speed calculation strategies (step P2), performed each 5 msec. Here, the car speed Xn is calculated (step P1) by reading out the latest pulse cycle filtered value Ti* from a given address of RAM, and applying an appropriate coefficient to an inverse of Ti*. Then, using the preceding car speed filtered value $X\&_{n-1}$ and the latest car speed Xn, the latest car speed filtered value Xn is determined by the equation 30 (m=4) (Step P3), and put into RAM. All this done, the next process is proceeded to.

In this preferred embodiment, a primary integrating filter is cited as an example, but this filtered value calculation is applicable to a secondary or other filter.

As described on the previous pages, in this car speed sensing scheme, pulse cycle Ti in a given number (4 in this embodiment) is determined by synchronizing it with each pulse of pulse signals from a car speed sensor 6, and the value is filtered by the equation 22 to calculate a pulse cycle filtered value Ti*, which is converted at each specified interval into an inverted number to determine the are speed Xn. Then, the value is filtered with the equation 30 to determine a car speed filtered value Xn* and introduced as cruising car speed Van. Accordingly, and disturbance of pulse signals caused by the car speed sensor 6, and also car speeds with less low-frequency modulation can be obtained. For this reason, the car speed Vn is always a true representation of the actual car speed, thereby leading to improved driving stability.

More specifically, the pulse cycle calculation procedure in which pulse-to-pulse cycle Ti in synchronism with pulse is also a traveling distance interval synchronization measurement. In this procedure, moreover, time cycle measurement is carried out at a specified interval to give the car speed Xn. Consequently, in the pulse cycle and time synchronization measurements, a modulation waveform and a modulation frequency differ with regard to the same input, thus giving no constant modulation operation. In addition, for pulse synchronization measurement and time synchronization measurement, respectively, appropriate integrating filters are provided to give traveling car speed Vn showing less modulation characteristics.

FIG. 38 is a block diagram showing the processing strategies of other embodiments of this invention. The car speed signal from the car speed sensor is deprived of noise by passing the same through a car speed filter 184 according to the previously described method, giving a car speed Vn. A set switch 8 is a switch used to set a target car speed VM. The set switch 8 is turned on to read a car speed Vn at that time into a memory 190. The throttle valve is controlled depending on the difference between the target car speed VM and the car speed Vn. In this preferred embodiment, to compensate for the operation delay of an actuator, and the control log due to hysteresis and ply of the throttle and the drive train, the skipped car speed VS is used, where a derivative component ΔV for processing the car speed VN by a differentiator means is added to the car speed VM. The difference signal between the target car speed VM and the skipped car speed VS (VM−VS) is fed to a duty conversion means used to determine the duty ratio for controlling said actuator. Said derivative component ΔV from the differention means is also fed to a distributor means 168 and a corrections means 1780. Using the corrections means 170, corrected values K1 and K2 are determined according to the derivative component ΔV or vehicle acceleration. When using the discrimination means 168, the derivative component ΔV or vehicle acceleration is higher than a specified value (during acceleration conditions) or lower (during deceleration conditions), a switch 172 is thrown on, to fed the corrected values K1 and K2 to the duty ratio conversion means. The duty ratio conversion means is also provided with a control gain VB for duty ratio control and determines a duty ratio D.

FIGS. 39(A) and 39(B) are graphs showing the operation of this preferred embodiment. The control using the conventional system is as indicated by FIG. 39(A). For instance, in combined use with an automatic transmission, when a vehicle is moving from a level to a uphill road, the duty ratio increases with decreasing speed, but if a small gear ratio is selected, the car speed decreases due to lack of tractive force. When the difference between the target and actual car speeds reaches the specified value, the gear is shifted down. When this occurs, the traction increases and the car accelerates, but at the time of the shiftdown occurring the duty ratio has become considerably large, and it takes time to reduce the duty ratio to the required value. Hence, the car speed shoots over. In this preferred embodiment, considering that when acceleration (deceleration) is massive, the actual duty ratio is greatly varied from the required duty ratio, the control delay is compensated to prevent overshoot by applying a large correction duty ratio temporarily.

FIG. 40 shows an embodiment of the microprocessor based processing scheme of the indicated in FIG. 38. In this example a duty ratio D is determined by the following formula:

$$D=(VM-VS)VB+SD-FD+FU \tag{30a}$$

where,

FD: correction duty ratio during acceleration conditions

FU: correction duty ratio during deceleration conditions

At step q1, a car speed signal is fed from the car speed sensor, and at step q2, a car speed Vn is determined by the filtering method described above. At step q3, an acceleration $\Delta V$ is determined from the difference between the car speed previously determined, $V_{n-1}$ and the latest one, Vn. Step q4 is a step provided to determined whether an acceleration is beyond the specified value (1.25 km/h/sec), and when an acceleration is beyond the specified value, th correction duty ratio, FD, is increased in proportion to the acceleration $\Delta D$ (FD—FD+K1·$\Delta D$: K1=4). In this preferred embodiment, the processing cycle is 50 msec; for instance, when the acceleration is 1.25 km/h/sec, $\Delta V$ is 0.0625 km/h, and hence, the correction amount becomes FD←FD+4×0.0625=FD=0.25. Steps q6 and q7 are provided to set a upper limit $\gamma 1$ on the correction duty ratio FD, and in this preferred embodiment, the upper limit $\gamma 1$ of the correction duty ratio FD is set at 20%. When the acceleration is within the specified value (1.25 km/h/sec), the correction duty ratio FD is decreased at step q8 FD—FD—$\beta_2$:$\beta_2$=5). This decrease in correction duty ratio FD should be done quickly, because when the acceleration is within the specified value (1.25 km/h/sec), the correction duty ratio FD has no longer become necessary, and thus it is advantageous, of control purposes, to refrain from making a correction with the correction duty ratio FD. Steps q9 and q10 are provided to set a lower limit on the correction duty ratio FD to prevent FD from dropping below zero or main an inner correction.

Steps q1 to q17 are steps designed to determine a correction duty ratio FU during deceleration, in contrast with the steps q4 to q10. At q11 is a step used to determine whether an acceleration is below the specified value ($-1.23$ km/h/sec) (or a deceleration is above the value). In an below is below the thee specified value, a correction duty ratio FU is increase at step q12 depending on the acceleration (FU—FU=K2·$\Delta V$:K2=4). Steps q13 and q14 are given to set an upper limit 2 on the correction duty ratio FU, and in this embodiment, the limit 2 is set at 10%. When an acceleration is out of the specified value ($-1.25$ km/h/sec), the correction duty ratio FD is decreased at step q15 (FU—FU—$\beta_4$:$\beta_4$=5) The decrease in the correction duty ratio FU should be as quick as in the case of the correction duty ratio FD. steps q16 and q17 are designed to set a lower limit on the correction duty ratio RU, thereby preventing the correction duty ratio FU from dropping below 0 or making an inverse correction. Step q18 is a step used to determine a skipped car speed VS, performing operations of a car speed Vn and its derivative component $\Delta V$. The, at step q13, a duty ratio D is determined from the aforestated various values in accordance with the equation. At step q20, a duty ration 20 is put out, and is used to control the actuator (step q21).

In sum, the forgoing process consists of determining an output duty ratio D by the following equation, $$D=(VM-VS)VB+SD-FD+FU \tag{30a}$$

and of varying correction duty ratios FD and FU as follows with the calculation cycle of a microprocessor as a unit of change:

1. If $\Delta V \geq =\alpha 1$, then FD←FD+K1 V
2. $\Delta V<\alpha 1$, then FD←FD—$\beta 2$ However, $0 \leq FD \leq \gamma 1$ 3. If $\Delta V \leq -\alpha 2$, then FU—FU+K2 ·$\Delta V$
4. If $\Delta V > -\alpha 2$, FU—FU—$\beta 4$ when However, $0 \leq FU \leq \gamma 2$ The cases 1 and 3 above refer to the time of compensation, and the cases 2 and 4 represent the resetting time.

The resetting coefficients $\beta 2$ and $\beta 4$, and the limiting coefficients $\gamma 1$ and $\gamma 2$ are constant, while the compensation terms K1·$\Delta V$ and K2·$\Delta V$ are variables including an acceleration $\Delta V$ (K1 and K2 are coefficients), and are used to change FD and FU in proportion to an acceleration $\Delta V >$.

In this preferred embodiment, $\alpha 1=\alpha 2=1.23$ km/h/sec, K1=K2=4, $\beta 2=\beta 4=5\%$, $\gamma 1=20\%$, and $\gamma 2=10\%$ In this embodiment, the correction duty ratios for acceleration and deceleration are separately processed depending on their characteristics to permit more accurate control.

FIG. 41 is another example of another microprocessor-based processing scheme. Here, a duty ratio D is determined by:

$$D=(VM-VS)VB+SD-F \tag{30b}$$

Unique features of this embodiment are found in a process 178, where the remaining steps, U1 to U3 and U11 to U14 are identical to q1 to q3 and q18 to q21 in FIG. 20, hence they are left unmentioned here. Step U2 is a step used to determine whether an acceleration is plus or minus, i.e., whether the vehicle is being accelerated or decelerated. If it is being accelerated, a correction duty ratio is obtained at step U5 (F←F+K1 $\Delta V$: K1=4), and the correction duty ratio F is restricted within its upper limit ($\gamma 1=20$) at steps U6 and U7. If the car is being decelerated, a correction duty ratio F is obtained at step U8 (F←F+K2·$\Delta V$: K2=4), and the duty ratio F is restricted within its upper limit ($\gamma 2=-10$) at steps 9 and 10.

To sum up, this processing procedure consists of computing an output duty ratio from the following equation, $$D=(VM-VS)/VB+SD-F \tag{30b}$$

and changing a correction duty ratio F in accordance with an acceleration V in the following manner:

1. If $\Delta V \geq 0$, then F—F+K1·$\Delta V$
2. If $\Delta V<0$, then F—F+K2·$\Delta V$ However, $-\gamma 2 \leq F \leq \gamma 2$ In this embodiment, K1=K2=4, $\gamma 1=20$, $\gamma 2=10$.

In this embodiment, a control scheme is simple enough to achieve with a short program, thus allowing curtailed memory capacity. Furthermore, FIG. 42 shows another example of a microprocessor-based processing strategy. A duty ratio D is determined by:

$$D=(VM-VS)VB+SD-FD+FU \quad (30c)$$

The operations in this preferred embodiment, ω1 to ω4, ω5 to ω11, and ω13 to ω21 are not mentioned here since they are identical to q1 to q4, q5 to q11 and q13 to q21 in FIG. 20. The difference between this embodiment and that in FIG. 20 lies in the fact that in the latter correction duty ratios FD and FU are increased or decreased in response to acceleration, while in this embodiment they are increased or decreased with time. Expressed in other words, if an acceleration is beyond the specified value α1 (α1=1.25 km/h/sec), a correction duty ratio FD is increased in a given amount at step ω5 (FD←FD+β1: β1=0.25). If an acceleration is lower than the specified value 2 (2=−1.25 km/h/sec), a correction duty ratio FU is increased in a specified amount at ω2 (FU←FU+β3:β3=0.25).

In sum, the forgoing process consists of determining an output duty ratio D by the following equation, $$D=(VM-VS)VB+SD-FD+FU \quad (30a)$$

and of changing correction duty ratios FD and FU as follows in proportion to time. Supposing the calculation cycle of a microprocessor to be a unit of change:

1. If $\Delta V \geq \alpha 1$, then FD←FD+β1
2. If $\Delta V < \alpha 1$, then FD←FD−β2
   However, $0 \leq FD \leq \gamma 1$
3. If $\Delta V \leq -\alpha 2$, then FU←FU+β3
4. If $\Delta V < -\alpha 2$, then FU←FU−β4
   However, $0 \leq FU \leq \gamma 2$ The cases 1 and 3 above refer to the time of compensation, and the cases 2 and 4 represent the resetting time.

The increasing and decreasing coefficients β1 to β4 and the limiting coefficients 1 and 2 are constant, and resetting is rapidly performed with β1<β2 and β3<β4.

Ib this example, 1=2=1.25 km/h/sec, β1=β3=0.25%, β2=β4=5%, γ1=20%, and γ2=10%. The calculation cycle is 50 msec, so that duty ratio correction is carried out at a rate of 5% (=0.25×20), and its resetting is performed at its twentyfold rate.

In this embodiment, there is no need to determine correction duty ratios FU and FD in proportion to car speeds, thereby achieving a shorter program and smaller memory capacity. Different correction duty ratios FD and FU are applied during acceleration and deceleration conditions, and thus control can be maintained so that it suits their respective characteristics. Although detailed descriptions are omitted, in the preferred embodiment in FIG. 41, the correction amount of a correction duty ratio F can be kept constant, i.e., F←F+β1 at step U5 and F←F+β2 at step U8.

In the examples of FIGS. 41 and 42, processing is repeated at specified intervals, hence the longer the time required for correction becomes, the greater a correction duty ratio is. As a result, quicker speeds are achieved at which a car speed converges to the target car speed.

This invention further relates to a car speed signal processing circuit of a constant speed traveling device for integrating and processing a car speed signal from the car speed sensor, and using its output in the setting of target car speed and detection of traveling car speed, in which setting is prohibited for a specified time when a car speed change exceeding a specified value occurs in the car speed signal.

In this constitution, as shown in FIG. 34, if the output of the integrating filter changes suddenly in response to input abnormality, the target car speed cannot be set (the memory is cleared) if the preset switch is pressed for a specified time including its converging time (for example, 3 seconds), so that constant speed traveling control at unexpected car speed V' can be securely prohibited although it is impossible to transfer to a constant speed traveling at a car speed V expected by the driver. This method is simpler in processing than the method of removing the noise N2 by the integrating filter in the previous stage (in which prediction is difficult).

FIG. 44 is a flow chart showing a processing thereof, in which the calculation cycle is 50 msec. The car speed filter 184 shown in FIG. 38 is the integrating filter, and advancing from step z1 to z3, the difference $VR_0-VR_1$ of two momentary values of the integrated output is compared with a specified value, and abnormal portion N2 in FIG. 43 is detected. In this case, $VR_0$ is the present calculated value, and VR1 is the previous calculated value. The car speed filter 184 may be placed somewhere between the buffer 186 and processing circuit 188 in FIG. 10.

In this embodiment, the criterion is the acceleration 1 km/h per 50 msec, therefore, 20 km/h/sec (generally, the limit is about 4 km/h/sec). If a speed change exceeding this standard is detected, the prohibit timer in the processing circuit 188 is set at step z6 to prohibit control in this period, and the prohibition is canceled at steps z7, z9. It means that, if the preset switch 8 in FIG. 10 or FIG. 38 is pressed, data is not stored in the memory 190 or processing circuit 188 (that is, it is cleared). This prohibition of control continues until the prohibit timer expires (for example, 3 seconds), and thereafter the prohibit timer is cleared, and the control mode is set at step z8. As a result, set signal processing is enabled, and when the preset switch 8 is pressed, the output of the car speed filter 184 at that time is stored in the memory 190 and processing circuit 188, and the constant speed traveling control using that output as the target car speed is started at steps z10, z11.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. A constant speed cruise control system for maintaining an actual car speed at a stored target car speed by duty ratio control of a control valve which is provided inside an actuator, to which an atmosphere or an engine vacuum is introduced alternatively, comprising:

a car speed sensor and a car speed detecting means for generating a signal in accordance with an actual detected car speed;

a memory means for storing said actual car speed detected by said car speed detecting means as the stored target speed in response to manipulation of a set switch;

a means for calculating a set duty ratio SD in accordance with a basic duty ratio in a constant speed control;

a means for calculating a duty ratio in accordance with a difference between said actual car speed and the stored target speed;

a means for actuating the control valve in response to an output ratio D which is determined by added said set duty ratio SD to said duty ratio;

a correction means for correcting said set duty ratio SD by excluding a car speed deviation which occurs when said output duty ratio D changes, said correction means comprising:

a first means for calculating a low-speed integrating element SD1 for following gradually to a value of said output duty ratio D in response to changes of said output duty ratio D;

a second means for calculating a high-speed integrating element DM for following quickly to a value of said output duty ratio D in response to changes of said output duty ratio D;

a third means for calculating a first correct value of
(DM−SD1)/n
wherein:
SD1: said low-speed integrating element
DM: said high-speed integrating element
n: a predetermined coefficient a fourth means for calculating said set duty ratio SD based on said low-speed integrating element SD1 and said first correction value.

2. A constant speed cruise control system according to claim 1, wherein said first means includes a second calculating means for calculating a second connection value determined in accordance with a difference between said low-speed integrating element SD1 or said set duty ratio SD and said output duty ratio D, and for changing said low-speed integrating element SD1 in response to said second connection Value $\beta$; and wherein said second means includes a third calculating means for calculating a third correction value of
(D−DM)/K
wherein:
D: said output duty ratio
DM: said high-speed integrating element
K: a predetermined coefficient,
and for changing said high-speed integrating element DM in response to said third correction value.

3. A constant speed cruise control system according to claim 2, wherein said third calculating means changes said predetermined coefficient K which determines a changing rate of said third correction value in accordance with said actual car speed and makes said changing rate large at high car speed.

4. A constant speed cruise control system according to claim 2, wherein said first means arranges said second correction value $\beta$ into values differentiated from one another in car speed regions for a specified speed after setting said target car speed.

5. A constant speed cruise control system according to claim 1, wherein said third means changes said predetermined coefficient n which determines a changing rate of said first correction value in accordance with said actual car speed and makes said changing rate large at a high car speed.

6. A constant speed cruise control system according to claim 1, further comprising a means for determining a car acceleration, and further comprising a means for changing said low-speed integrating element SD1 and said high-speed integrating element DM in response to a correction value based on said determined car acceleration as the values thereof change rapidly when said acceleration exceeds a specified value.

7. A constant speed cruise control system according to claim 1, wherein an upper limit and a lower limit are provided in at least one of said low-speed integrating element SD1, said high-speed integrating element DM and said set duty ratio SD.

8. A constant speed cruise control system according to claim 1, wherein said car speed detecting means comprises:

a means for measuring a time Ti of a specified number of consecutive pulses in response to pulses corresponding to a car speed;

a first filtering means for filtering said time Ti;

a means for sampling a measuring time Ti* filtered at a specified time interval and for calculating a car speed Xn based on a sampled time Ti*;

a second filtering means for outputting as an actual car speed Xn* a value obtained by filtering said car speed Xn.

9. A constant speed cruise control system for maintaining an actual car speed at a stored target car speed by duty ratio control of a control valve which is provided inside an actuator, to which an atmosphere or an engine vacuum is introduced alternatively, comprising:

a car speed sensor and a car speed detecting means for generating a signal in accordance with an actual car speed;

a memory means for storing said actual car speed detected by said car speed detecting means as the stored target speed in response to manipulation of a set switch;

a means for calculating a set duty ratio SD in accordance with a basic duty ratio in a constant speed control;

a means for calculating a duty ratio in accordance with a difference between said actual car speed and the stored target speed;

a means for actuating the control valve in response to an output duty ratio D which is determined by adding set said duty ratio SD to said duty ratio;

a correction means for correcting said set duty ratio SD by excluding a car speed deviation which occurs when said output duty ratio D changes, said correction means comprising:

a first means for calculating a correction value $\tau$ in response to a difference between said set duty ratio SD and said output duty ratio D;

a second means for changing said set duty ratio SD in response to said correction value $\tau$.

10. A constant speed cruise control system according to claim 9, wherein an upper limit and a lower limit are provided in said set duty ratio SD.

11. A constant speed cruise control system according to claim 9, wherein said first means arranges said correction value $\tau$ into values differentiated from one another in car speed regions for a specified speed after setting said target car speed.

12. A constant speed cruise control system according to claim 9, wherein the second means changes said set duty ratio SD as the ratio rapidly changes when a car acceleration exceeds a predetermined limit.

13. A constant speed cruise control system for maintaining an actual car speed at a stored target car speed by duty ratio control of a control valve which is provided inside an actuator, to which an atmosphere or an engine vacuum is introduced alternatively, comprising:

a car speed sensor and a car speed detecting means for generating a signal in accordance with an actual detected car speed;

a memory means for storing said actual speed detected by said car speed detecting means as the stored target speed in response to manipulation of a set switch;

a means for calculating a set duty ratio SD in accordance with a basic duty ratio in a constant speed control;

a means for calculating a duty ratio in accordance with a difference between said actual car speed and the stored target speed;

a means for actuating the control valve in response to a output duty ratio D which is determined by adding said set duty ratio SD to said duty ratio;

an acceleration detecting means for detecting an acceleration of a car;

a correction means for adding a correction duty ratio to said output duty ratio D when said acceleration exceeds a specified valve.

14. A constant speed cruise control system according to claim 13, wherein said correction means adds said correction duty ratio which is increasing in response to said acceleration to said output duty ratio D when acceleration exceeds said specified value.

15. A constant speed cruise control system according to claim 13, wherein said correction means adds said correction duty ratio which is increasing in response to the passage of time to said output duty ratio D when said acceleration exceeds said specified value.

* * * * *